(12) United States Patent
Fukuda et al.

(10) Patent No.: US 12,292,756 B2
(45) Date of Patent: May 6, 2025

(54) PEDAL DEVICE

(71) Applicant: DENSO CORPORATION, Kariya (JP)

(72) Inventors: Yasuhisa Fukuda, Kariya (JP); Etsugo Yanagida, Kariya (JP); Daisuke Hokuto, Kariya (JP); Takao Yamamoto, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 18/452,360

(22) Filed: Aug. 18, 2023

(65) Prior Publication Data

US 2023/0393606 A1 Dec. 7, 2023

Related U.S. Application Data

(63) Continuation of application No. PCT/JP2022/005054, filed on Feb. 9, 2022.

(30) Foreign Application Priority Data

Feb. 25, 2021 (JP) ................................. 2021-029094

(51) Int. Cl.
| | |
|---|---|
| *G05G 1/30* | (2008.04) |
| *B60K 26/02* | (2006.01) |
| *B60T 7/02* | (2006.01) |
| *B60T 7/04* | (2006.01) |
| *G05G 1/44* | (2008.04) |

(Continued)

(52) U.S. Cl.
CPC ............... *G05G 1/44* (2013.01); *B60T 7/04* (2013.01); *G05G 5/03* (2013.01); *G05G 5/05* (2013.01); *B60K 26/021* (2013.01)

(58) Field of Classification Search
CPC .. G05G 1/30; G05G 1/44; G05G 5/03; G05G 5/05; G05G 2505/00; B60T 7/04; B60T 7/06; B60K 26/02; B60K 26/021
See application file for complete search history.

(56) References Cited

U.S. PATENT DOCUMENTS

| | | | |
|---|---|---|---|
| 1,883,437 A | 10/1932 | Adams | |
| 2,895,346 A * | 7/1959 | Arch, Jr. ................ | B60K 26/02 |
| | | | 74/513 |

(Continued)

FOREIGN PATENT DOCUMENTS

| | | |
|---|---|---|
| CN | 201511825 U | 6/2010 |
| CN | 118613404 A * | 9/2024 |

(Continued)

OTHER PUBLICATIONS

U.S. Appl. No. 18/451,492 to Yasuhisa Fukuda filed Aug. 17, 2023 (83 pages).

*Primary Examiner* — Adam D Rogers
(74) *Attorney, Agent, or Firm* — Nixon & Vanderhye P.C.

(57) ABSTRACT

A pedal device mounted on a vehicle includes a housing, a pedal pad, and a reaction force generation mechanism. The housing is mounted on a vehicle body. The pedal pad is provided to be rotatable with respect to the housing. The reaction force generation mechanism is configured to include a plurality of resilient members each having a predetermined leaf spring. The reaction force generation mechanism is arranged in a space on the side opposite to a surface stepped on by a driver in the pedal pad to generate a reaction force against a pedaling force applied to the pedal pad by the driver.

20 Claims, 18 Drawing Sheets

(51) Int. Cl.
*G05G 5/03* (2008.04)
*G05G 5/05* (2006.01)

(56) References Cited

U.S. PATENT DOCUMENTS

| | | | | |
|---|---|---|---|---|
| 3,983,344 | A * | 9/1976 | Straihammer | A61C 1/0023 74/478 |
| 5,934,152 | A * | 8/1999 | Aschoff | B60K 26/02 701/1 |
| 6,298,746 | B1 | 10/2001 | Shaw | |
| 8,596,162 | B2 * | 12/2013 | Nozu | G05G 1/30 74/513 |
| 11,751,825 | B2 * | 9/2023 | Stepina | A61B 6/542 600/407 |
| 12,043,234 | B2 * | 7/2024 | Yanagida | B60T 7/06 |
| 12,084,022 | B2 * | 9/2024 | Yanagida | B60T 11/18 |
| 2004/0040408 | A1 | 3/2004 | Shaw et al. | |
| 2010/0175497 | A1 | 7/2010 | Nozu et al. | |
| 2014/0117602 | A1 | 5/2014 | Jeon | |
| 2017/0174029 | A1 | 6/2017 | Asbeck et al. | |
| 2018/0283967 | A1 | 10/2018 | Kato | |
| 2023/0391298 | A1 * | 12/2023 | Fukuda | B60T 7/06 |
| 2023/0393605 | A1 * | 12/2023 | Hokuto | B60T 7/042 |
| 2023/0393607 | A1 * | 12/2023 | Yamamoto | G05G 1/44 |
| 2023/0406270 | A1 * | 12/2023 | Hokuto | B60T 7/06 |
| 2024/0059143 | A1 * | 2/2024 | Ito | G05G 1/44 |
| 2024/0059260 | A1 * | 2/2024 | Ito | B60T 8/17 |
| 2024/0059261 | A1 * | 2/2024 | Hokuto | B60T 8/17 |
| 2024/0059262 | A1 * | 2/2024 | Hokuto | B60T 8/17 |
| 2024/0061462 | A1 * | 2/2024 | Fukuda | G05G 5/05 |
| 2024/0069585 | A1 * | 2/2024 | Burk | G05G 5/03 |
| 2024/0069588 | A1 * | 2/2024 | Arao | B60T 7/06 |
| 2024/0201725 | A1 * | 6/2024 | Arao | G05G 1/30 |
| 2024/0294147 | A1 * | 9/2024 | Nishimura | G05G 1/30 |

FOREIGN PATENT DOCUMENTS

| | | | | |
|---|---|---|---|---|
| DE | 10315589 A1 * | 10/2004 | | B60K 26/021 |
| DE | 202006016389 U1 * | 2/2007 | | G05G 1/30 |
| EP | 0480602 A1 * | 4/1992 | | |
| EP | 1233320 A2 * | 8/2002 | | B60K 26/021 |
| FR | 2847356 A1 * | 5/2004 | | B60K 26/021 |
| JP | S6452816 U | 3/1989 | | |
| JP | H07205775 A | 8/1995 | | |
| JP | 2001109532 A | 4/2001 | | |
| JP | 2001294058 A | 10/2001 | | |
| JP | 2014084091 A | 5/2014 | | |
| JP | 2017053796 A | 3/2017 | | |
| JP | 2017506597 A | 3/2017 | | |
| WO | 2008153204 A1 | 12/2008 | | |
| WO | 2022181326 A1 | 9/2022 | | |
| WO | 2022181329 A1 | 9/2022 | | |
| WO | 2022181330 A1 | 9/2022 | | |
| WO | 2022181331 A1 | 9/2022 | | |
| WO | WO-2022239578 A1 * | 11/2022 | | B60K 26/021 |

* cited by examiner

PEDAL DEVICE

CROSS REFERENCE TO RELATED APPLICATION

The present application is a continuation application of International Patent Application No. PCT/JP2022/005054 filed on Feb. 9, 2022, which designated the U.S. and claims the benefit of priority from Japanese Patent Application No. 2021-029094 filed on Feb. 25, 2021. The entire disclosures of all of the above applications are incorporated herein by reference.

TECHNICAL FIELD

The present disclosure relates to a pedal device mounted on a vehicle.

BACKGROUND

A known pedal device mounted on a vehicle has been conventionally used as, for example, an accelerator pedal device or a brake pedal device.

SUMMARY

According to one aspect of the present disclosure, a pedal device is to be mounted on a vehicle. The pedal device comprises a housing, a pedal pad, and a reaction force generation mechanism.

BRIEF DESCRIPTION OF THE DRAWINGS

The above and other objects, features and advantages of the present disclosure will become more apparent from the following detailed description made with reference to the accompanying drawings. In the drawings.

DETAILED DESCRIPTION

Figure 1:
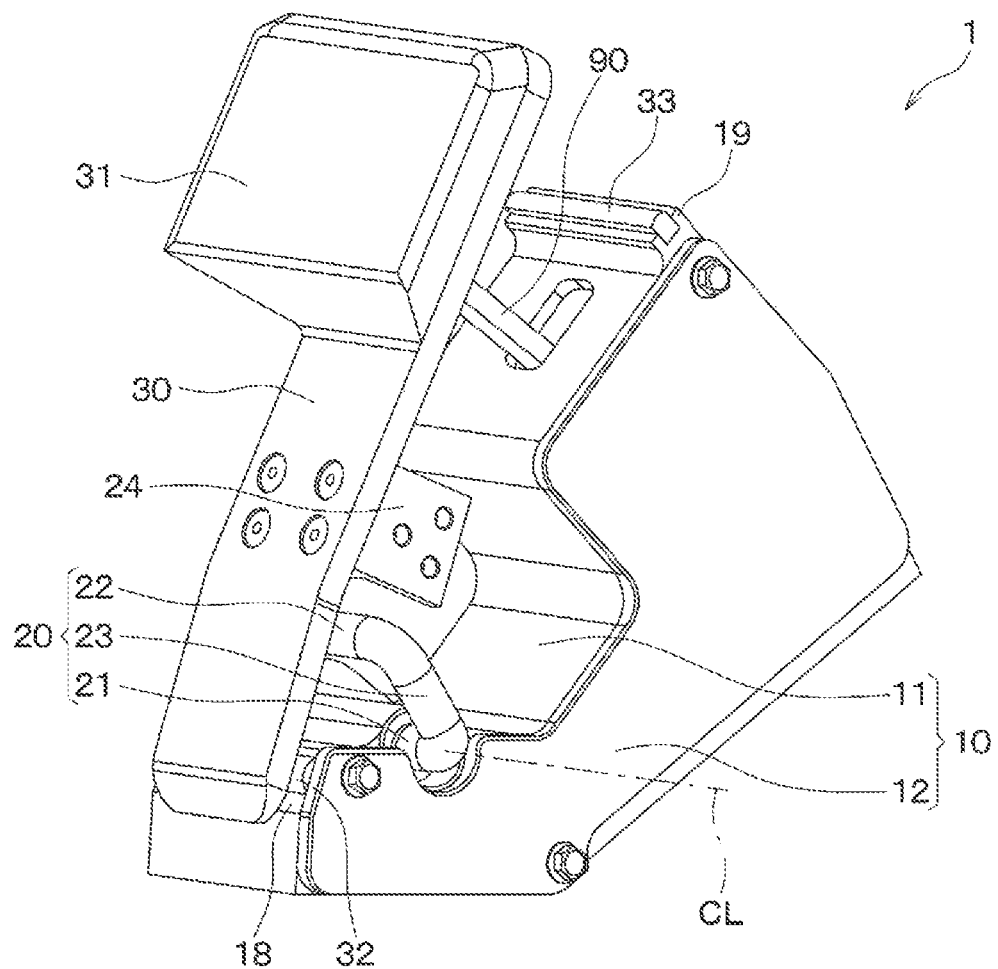
FIG. 1 is a perspective view of a pedal device according to a first embodiment.

Hereinafter, examples of the present disclosure will be described.

According to an example of the present disclosure, a pedal device is mounted on a vehicle and used as, for example, an accelerator pedal device or a brake pedal device.

According to an example of the present disclosure, a brake pedal device is equipped with a reaction force generation mechanism which generates a reaction force against a pedaling force by a driver applied to a pedal pad. The reaction force generation mechanism is, for example, referred to as a pedal simulator. The reaction force generation mechanism has a configuration in which a plurality of coil springs are coaxially arranged and arranged so as to overlap in a radial direction. Further, this reaction force generation mechanism has a configuration in which the end of another coil spring is installed at the end of a predetermined coil spring through a member called a spring seat.

However, the reaction force generation mechanism is, for example, required to make the outer diameter and wire diameter of the coil springs large in the case where a large reaction force is generated against the driver's pedaling force applied to the pedal pad. An issue therefore arises in that when the reaction force generating mechanism is used in the pedal device, a large space for installing the reaction force generating mechanism is required in a region on the side opposite to the surface stepped by the driver in the pedal pad, thus resulting in an increase in the physical size of the pedal device.

According to one example of the present disclosure, a pedal device is to be mounted on a vehicle. The pedal device comprises a housing, a pedal pad, and a reaction force generation mechanism. The housing is mounted on a vehicle body. The pedal pad is rotational relative to the housing. The reaction force generation mechanism includes a plurality of resilient members including a predetermined leaf spring. The reaction force generation mechanism is arranged in a space on an opposite side of a surface of the pedal pad, which is to be stepped on by a driver and configured to generate a reaction force against a pedaling force applied to the pedal pad by the driver.

According to this, for example, assuming if the resilient member of the reaction force generation mechanism is constituted only of a coil spring, a space corresponding to "wire diameter of coil spring x number of turns" and "the amount of deflection" is required. On the other hand, when a leaf spring is used for the resilient member of the reaction force generation mechanism, it may be sufficient to have a space corresponding to the "thickness of the leaf spring" and the "amount of deflection". Therefore, the space required for installing the leaf spring becomes smaller than the space required for installing the coil spring. Therefore, in the pedal device according to one aspect of the present disclosure, it is possible to reduce the space on the side opposite to the surface stepped on by the driver in the pedal pad by using the leaf spring as the resilient member of the reaction force generation mechanism. As a result, the present pedal device can be reduced in physical size.

Hereinafter, embodiments of the present disclosure will be described with reference to the drawings. In each of the following embodiments, parts which are the same or equivalent to each other are denoted by the same reference numerals, and description thereof will be omitted.

First Embodiment

A first embodiment will be described with reference to FIGS. 1 to 10. A pedal device 1 is mounted on a vehicle and used as an accelerator pedal device or a brake pedal device or the like stepped on and operated by a driver's pedaling force. Further, the pedal device 1 includes an organ type and a pendant type.

In the present embodiment, as an example of the pedal device 1, a brake pedal device used in a brake-by-wire system will be described. The brake-by-wire system is a system which generates hydraulic pressure in a master cylinder through drive control of an electronic control device, based on an electric signal output from a sensor of the pedal device 1 and drives brake pads of each wheel through a brake circuit by the hydraulic pressure to brake the vehicle.

As shown in FIGS. 1 to 5, the pedal device 1 is an organ-type pedal device 1 having a housing 10, a shaft 20, a pedal pad 30, a sensor unit 40, and a reaction force generation mechanism 50, etc. The organ-type pedal device 1 refers to one having a configuration in which a portion of the pedal pad 30 to be stepped on by the driver is arranged above in the vertical direction when mounted on the vehicle with respect to the center of rotation (hereinafter referred to as a "rotational axis CL").

Figure 3:
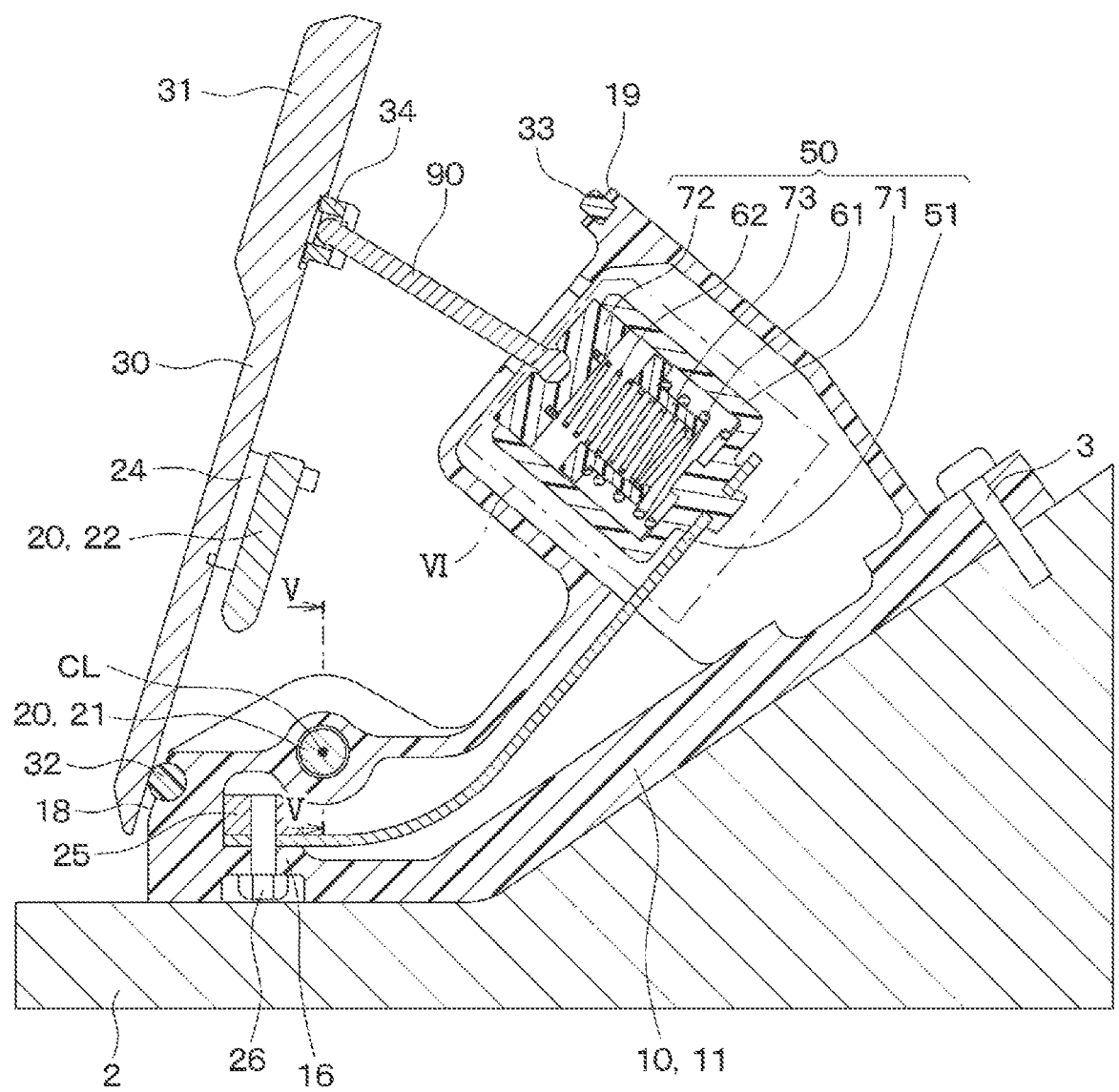
FIG. 3 is a cross-sectional view perpendicular to a pedal axis of rotation in the pedal device according to the first embodiment.

As shown in FIG. 3, the housing 10 is mounted on a part of a vehicle body. Specifically, the housing 10 is attached by screws 3 to a floor 2 or a dash panel, or the like in the interior of the vehicle. The dash panel is a partition wall which separates the interior of the vehicle from the exterior of the vehicle such as an engine room of the vehicle, and is sometimes also referred to as a bulkhead.

Figure 2:
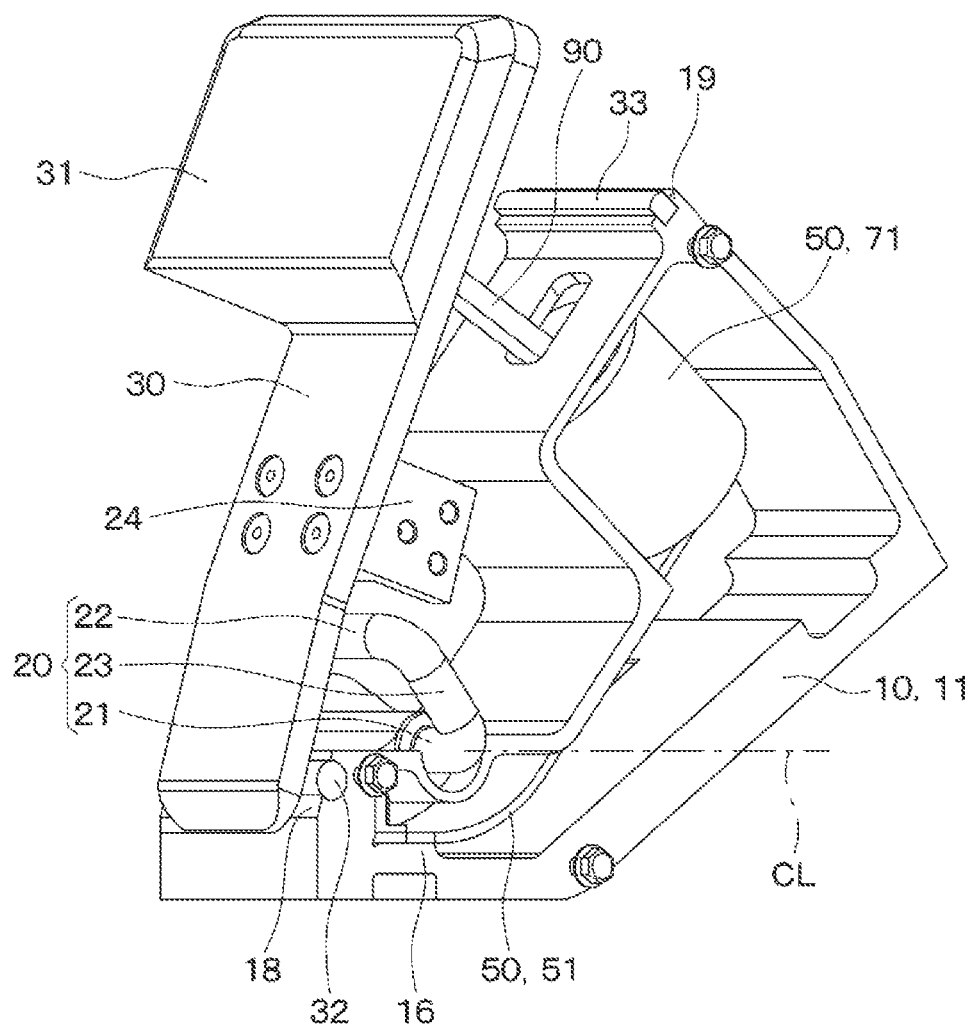
FIG. 2 is a perspective view of the pedal device according to the first embodiment with a housing cover removed.
Figure 4:
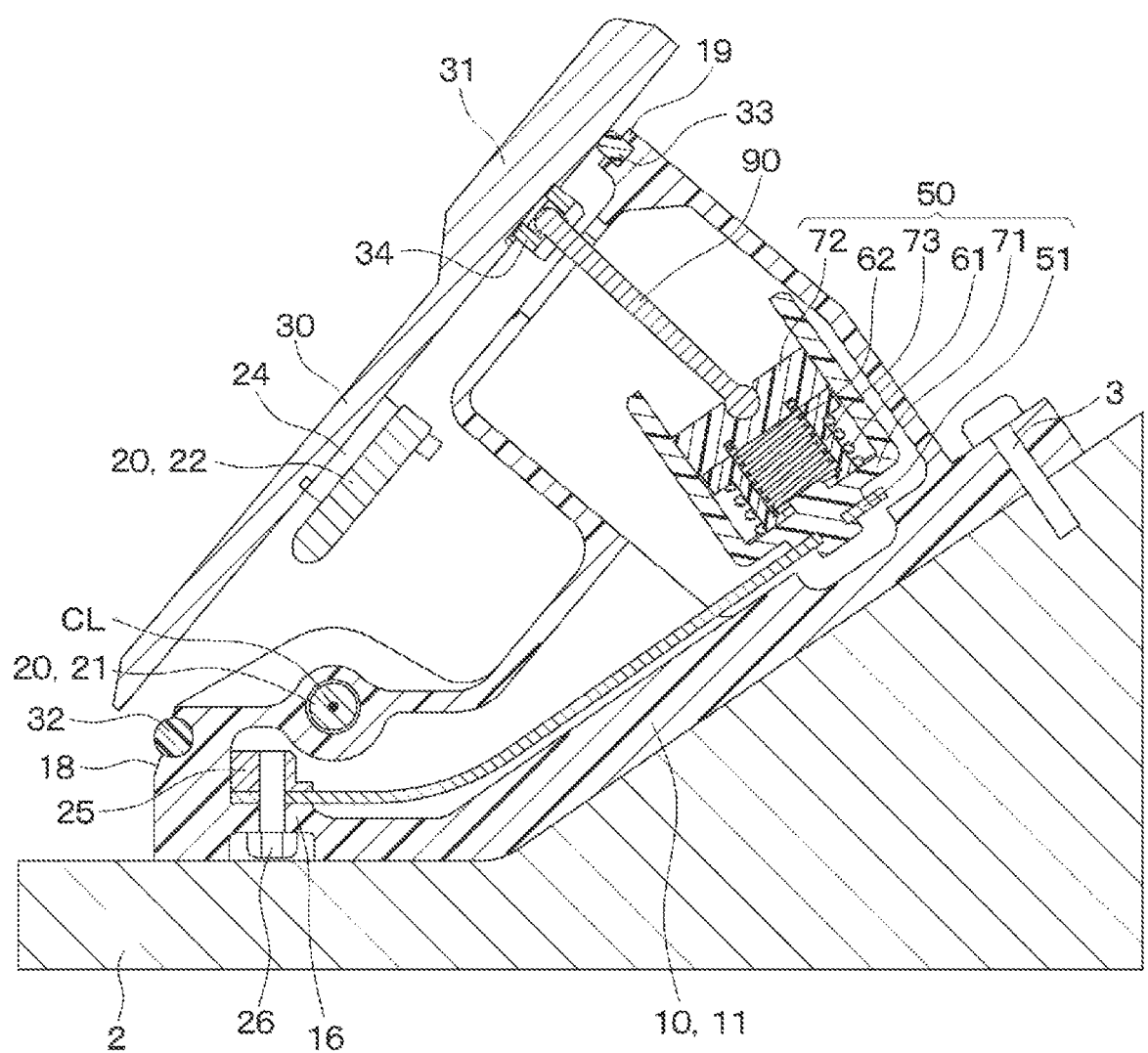
FIG. 4 is a cross-sectional view showing a state in which a pedal pad is rotated in the pedal device according to the first embodiment.
Figure 5:
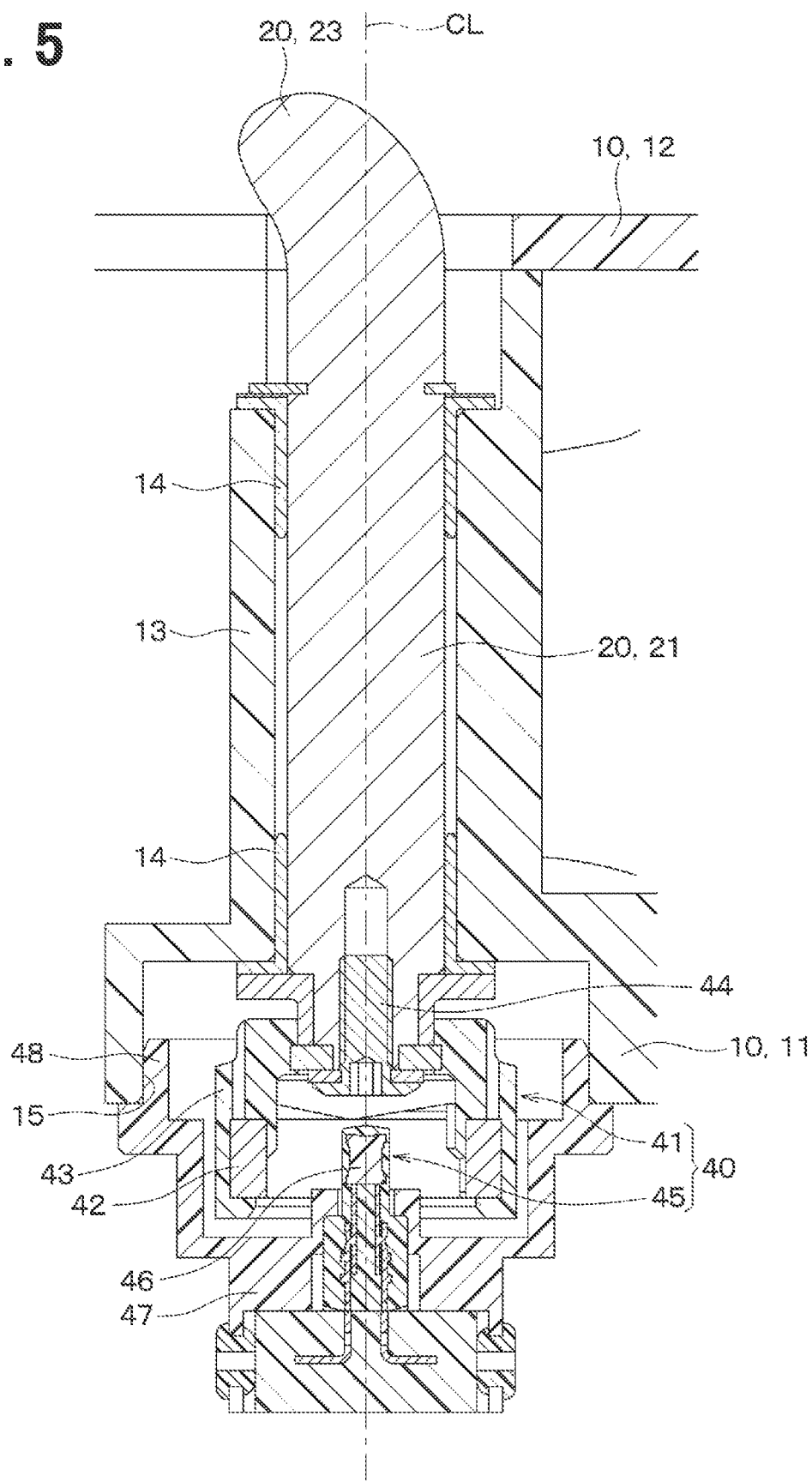
FIG. 5 is a cross-sectional view taken along line V-V of FIG. 3.

As shown in FIGS. 1 and 2, the housing 10 has a housing body 11 and a housing cover 12. As shown in FIG. 4, the housing 10 is provided in a region between the back surface of the pedal pad 30 moved to the maximum rotational position and the vehicle body (specifically, the floor 2 or the dash panel). As shown in FIGS. 3 to 5, there is formed inside the housing body 11, a space in which the reaction force generation mechanism 50 and the sensor unit 40, etc. are provided. Further, as shown in FIG. 5, the housing body 11 is provided with a shaft receiving portion 13 for rotatably supporting the shaft 20. On the other hand, the housing cover 12 shown in FIG. 1 is provided on the side surface of the housing body 11 and closes a side opening of the space formed inside the housing body 11.

As shown in FIG. 5, the shaft 20 is rotatably supported by the shaft receiving portion 13 provided on the housing body 11. Specifically, a cylindrical bearing 14 for supporting the shaft 20 is attached to the shaft receiving portion 13 provided on the housing body 11. The shaft 20 is supported by the bearing 14. Therefore, the shaft 20 can rotate as the rotational axis CL about the center of a hole of the shaft receiving portion 13 (i.e., the center of the bearing 14). The shaft 20 is supported only by the shaft receiving portion 13 provided on the housing body 11 and is not supported by the housing cover 12.

As shown in FIGS. 1, 2, and 5, the shaft 20 is formed by, for example, bending a cylindrical metal plural times, and has a shaft portion 21, a fixing portion 22, and a connecting portion 23. The shaft portion 21 is a portion which extends parallel to the center line of the shaft receiving portion 13 (i.e., the rotational axis CL of the shaft 20) and is arranged in the shaft receiving portion 13. The fixing portion 22 is a portion which is non-rotatably fixed to the pedal pad 30. In the present embodiment, the fixing portion 22 is fixed to a fixing fitting 24 provided on the surface of the pedal pad 30 opposite to the surface which receives the pedaling force from the driver (hereinafter referred to as a "back surface of the pedal pad 30"). The connecting portion 23 is a portion which connects the shaft portion 21 and the fixing portion 22.

The pedal pad 30 is formed of, for example, a metal or resin or the like in a plate shape and is arranged obliquely with respect to the floor 2. Specifically, the pedal pad 30 is obliquely arranged so that the upper end thereof faces the front of the vehicle and the lower end thereof faces the rear of the vehicle. A thick portion 31 is provided at the upper portion of the pedal pad 30 as a portion to be stepped on by the driver. The thick portion 31 is arranged above the rotational axis CL in the vertical direction when mounted on the vehicle. The pedal pad 30 is not limited to the arrangement shown in the figure, and may be arranged substantially vertical to the floor 2, for example.

As described above, the back surface of the pedal pad 30 and the fixing portion 22 of the shaft 20 are fixed by the fixing fitting 24. Therefore, the pedal pad 30 rotates about the same rotational axis CL as the shaft 20 within a predetermined angular range. That is, the rotational axis CL of the pedal pad 30 and the rotational axis CL of the shaft 20 are the same.

FIGS. 1 to 3 show a state in which the pedaling force of the driver is not applied to the pedal pad 30. On the other hand, FIG. 4 shows a state in which the pedaling force of the driver is applied to the pedal pad 30, and the pedal pad 30 is rotated in response to the pedaling force. Thus, the pedal pad 30 has a portion in front of the vehicle from the rotational axis CL, which is rotated and moved toward the floor 2 side or the dash panel side as the driver's pedaling force applied to the thick portion 31 increases. Further, the pedal pad 30 has a portion in front of the vehicle from the rotational axis CL, which is rotated and moved upward or toward the driver's side in response to a decrease in the driver's pedaling force applied to the thick portion 31.

The amount of operation of the pedal pad 30 (i.e., the rotational angle of the pedal pad 30) stepped on by the driver is the same as the rotational angle of the shaft 20. The rotational angle of the pedal pad 30 and the shaft 20 is directly detected by the sensor unit 40 provided on or around the rotational axis CL of the shaft 20. In the following description, the rotational angle of the pedal pad 30 and the shaft 20 is referred to as a "pedal rotational angle".

As shown in FIG. 5, the sensor unit 40 has a rotating portion 41 provided on the shaft 20 and a signal output portion 45 which is provided on the housing 10 and outputs a signal corresponding to the phase of the rotating portion 41. The rotating portion 41 includes, for example, a magnetic circuit 42 formed in a cylindrical shape by a magnet and a yoke or the like, and a holding portion 43 which holds the magnetic circuit 42, etc. The rotating portion 41 is fixed to the end of the shaft 20 by a bolt 44 or the like and rotates together with the shaft 20. Therefore, the center of rotation of the rotating portion 41 and the rotational axis CL of the shaft 20 are the same. The magnetic circuit 42 which configures the rotating portion 41 forms a magnetic field in which the magnetic flux flows so as to intersect the rotational axis CL of the shaft 20.

On the other hand, the signal output portion 45 includes one or more Hall ICs 46, a sensor holding portion 47 to mold the Hall ICs 46, etc. The Hall IC 46 has a Hall element and an integrated circuit which performs amplification of a signal output from the Hall element, and the like. The Hall IC 46 outputs an electric signal corresponding to a magnetic flux density passing through a magnetic sensitive surface of the Hall element. When the rotating portion 41 rotates around the rotational axis CL together with the shaft 20, the magnetic flux density passing through the magnetic sensitive surface of the Hall element of the Hall IC 46 changes. Therefore, the signal output portion 45 outputs an electric signal corresponding to the rotational angle of the pedal pad 30 and the shaft 20 (i.e., the pedal rotational angle).

An opening 15 for installing the signal output portion 45 is provided at a position corresponding to one end side of the shaft 20 in the housing 10. On the other hand, the sensor holding portion 47 of the signal output portion 45 is provided with a protrusion 48 fitted onto an inner wall surface of the opening 15 provided in the housing 10. By fitting the outer wall surface of the protrusion 48 provided on the sensor holding portion 47 of the signal output portion 45 to the inner wall surface of the opening 15 provided in the housing 10, the sensor center of the signal output portion 45 and the rotational axis CL of the shaft 20 are assembled coaxially.

As shown in FIGS. 1 to 4, the minimum rotational position and the maximum rotational position of the pedal pad 30 are defined by a fully close stopper 32 and a fully open stopper 33, respectively. Both the fully close stopper 32 and the fully open stopper 33 are formed of resin or rubber, and the surfaces thereof which come into contact with the back surface of the pedal pad 30 are formed into convex surfaces curved toward the pedal pad 30 side.

The fully close stopper 32 is provided in a portion of the housing 10 on the rear side of the vehicle relative to the rotational axis CL of the pedal pad 30 and the shaft 20. Specifically, the fully close stopper 32 is embedded in a wall surface 18 facing rearward and obliquely upward of the vehicle in a portion of the housing 10 on the rear side of the vehicle. As shown in FIGS. 1 to 3, the fully close stopper 32 comes into contact with the back surface of the pedal pad 30 when the pedaling force of the driver is not applied to the pedal pad 30, and defines the minimum rotational position of the pedal pad 30.

The fully open stopper 33 is provided at a portion of the housing 10 on the front side of the vehicle relative to the rotational axis CL of the pedal pad 30 and the shaft 20. Specifically, the fully open stopper 33 is provided at an upper end portion 19 of the wall surface of the housing 10 on the front side of the vehicle. Described in detail, the fully open stopper 33 is embedded in a wall surface of the housing 10 facing rearward and obliquely upward of the vehicle at the portion of the housing 10 on the front side of the vehicle. As shown in FIG. 4, the fully open stopper 33 comes into contact with the back surface of the pedal pad 30 when the driver's pedaling force applied to the pedal pad 30 increases, and defines the maximum rotational position of the pedal pad 30.

As shown in FIGS. 3 and 4, the reaction force generation mechanism 50 which generates a reaction force against the pedaling force applied to the pedal pad 30 by the driver is provided in a region opposite to the surface to be stepped on by the driver in the pedal pad 30. Since the pedal device 1 is provided with the reaction force generation mechanism 50, even if the mechanical connection between the pedal pad 30 and the master cylinder is abolished, the same reaction force as when the pedal pad 30 and the master cylinder are connected can be obtained.

The reaction force generation mechanism 50 includes a plurality of resilient members including a predetermined leaf spring 51 and is provided inside the housing 10. Specifically, in the present embodiment, the reaction force generation mechanism 50 is constituted of a leaf spring 51, a first coil spring 61, a second coil spring 62, a first holder 71, a second holder 72, and a spring seat 73, etc.

The leaf spring 51 is a member formed in a flat plate shape and resiliently deformed when receiving a load in a plate thickness direction. The leaf spring 51 has a curved shape whose longitudinal direction is convex toward the floor 2 side in a state of not receiving the load. The curved portion of the leaf spring 51 is provided in a region closer to the rotational axis CL of the pedal pad 30 than the central position in the longitudinal direction. The leaf spring 51 is arranged along a virtual plane whose longitudinal direction is perpendicular to the rotational axis CL. That is, both the longitudinal direction of the leaf spring 51 and the longitudinal direction of the pedal pad 30 are arranged along the virtual plane perpendicular to the rotational axis CL. The pedal pad 30 rotates along the virtual plane perpendicular to the rotational axis CL when receiving a pedaling force from the driver. When the leaf spring 51 receives a load in the plate thickness direction, the leaf spring 51 is bent along the virtual plane perpendicular to the rotational axis CL. Thus, the leaf spring 51 has a shape and arrangement such that it can be resiliently deformed as large as possible within the space of the housing 10 provided in the limited region between the back surface of the pedal pad 30 moved to the maximum rotational position and the vehicle body.

One end of the leaf spring 51 in the longitudinal direction is arranged in a region on the floor 2 side or the dash panel side of the vehicle interior with respect to the rotational axis CL of the pedal pad 30. Further, one end of the leaf spring 51 in the longitudinal direction is attached to a fixing base 16 provided at a portion of the housing 10 on the floor 2 side or the dash panel side of the vehicle interior. Specifically, one end of the leaf spring 51 in the longitudinal direction is installed on the fixing base 16 of the housing 10, and a nut member 25 having a screw hole is installed thereon. Holes are provided in the end of the leaf spring 51 and the fixing base 16, respectively. A bolt 26 is inserted into the hole of the fixing base 16 from the surface of the fixing base 16 on the floor 2 side. The bolt is inserted through the hole of the leaf spring 51 and screwed into the screw hole of the nut member 25. Consequently, one end of the leaf spring 51 in the longitudinal direction is fixed to the fixing base 16 of the housing 10.

Although the configuration in which one end of the leaf spring 51 is attached to the housing 10 has been described in the present embodiment, the present invention is not limited to this. A configuration may be adopted in which one end of the leaf spring 51 is directly fixed to the floor 2 or the dash panel of the vehicle interior.

Further, although the shape of the leaf spring 51 has been described as being flat in the present embodiment, the shape is not limited to this. As described in a fifth embodiment to be described later, for example, the leaf spring may have a shape in which at least either of the plate thickness or the plate width of the plate is gradually changed. In addition, although the shape of the leaf spring 51 has been described as being curve-shaped in the longitudinal direction in the present embodiment, the shape is not limited thereto. As described in a second embodiment and the like to be described later, for example, the shape may be linear in the longitudinal direction with no load applied.

The first coil spring 61, the second coil spring 62, the first holder 71, the second holder 72, and the spring seat 73, etc., which constitute the reaction force generation mechanism 50, are provided at the other end of the leaf spring 51 in the longitudinal direction. That is, in the present embodiment, the predetermined leaf spring 51 which constitutes the reaction force generation mechanism 50, and the resilient members (i.e., the first coil spring 61 and the second coil spring 62) other than the predetermined leaf spring 51 are configured to be arranged in series. In the present specification, the series arrangement means that the resilient member other than the predetermined leaf spring 51 is arranged at one end or the other end of the predetermined leaf spring 51.

Specifically, the first holder 71 is fixed to the other end of the leaf spring 51 in the longitudinal direction. The first coil spring 61, the spring seat 73, the second coil spring 62, and the second holder 72 are provided inside the first holder 71 in this order.

Figure 6:
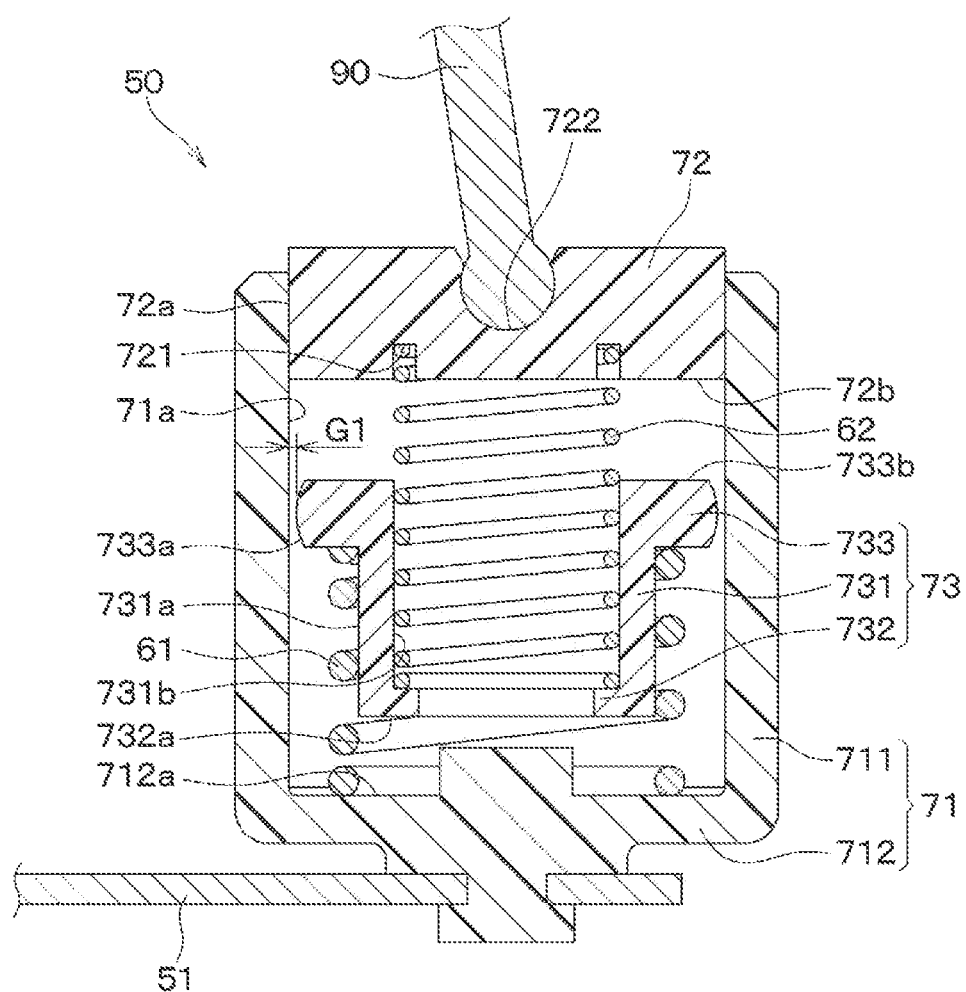
FIG. 6 is an enlarged view of a VI portion of FIG. 3.

As shown in FIG. 6, the first holder 71 is formed in a bottomed cylindrical shape, and has a cylindrical tubular portion 711 and a bottom portion 712 provided at the end of the tubular portion 711 on the leaf spring 51 side. The bottom portion 712 of the first holder 71 is fixed to the other end of the leaf spring 51 in the longitudinal direction by, for example, bolts or rivets or the like.

The first coil spring 61 is provided inside the first holder 71. In the first coil spring 61, one end thereof in its axial direction is engaged with the bottom portion 712 of the first holder 71, and the other end thereof in its axial direction is engaged with a flange portion 733 of the spring seat 73.

The spring seat 73 includes a cylindrical spring seat tubular portion 731, a spring seat bottom portion 732 provided at the end of the spring seat tubular portion 731 on the leaf spring 51 side, and the flange portion 733 provided so as to expand radially outward from the end of the spring seat tubular portion 731 on the pedal pad 30 side. The spring seat tubular portion 731 is provided inside the first coil spring 61. A radially outward outer wall surface 733a of the flange portion 733 of the spring seat 73 is a curved surface which is made convex radially outward. A predetermine gap G1 is provided between the outer wall surface 733a and a radially inward inner wall surface 71a of the tubular portion 711 of the first holder 71. Therefore, the spring seat 73 can reciprocate in the axial direction inside the first holder 71.

A radially outward outer wall surface 731a of the spring seat tubular portion 731 functions as a guide surface which guides the first coil spring 61 to be bent in the axial direction while restricting radial movement of the first coil spring 61. A radially inward inner wall surface 731b of the spring seat tubular portion 731 functions as a guide surface which guides the second coil spring 62 to be bent in the axial direction while restricting radial movement of the second coil spring 62.

The second coil spring 62 is provided inside the spring seat tubular portion 731. The second coil spring 62 has one end in the axial direction engaged with the spring seat bottom portion 732 and the other end in the axial direction engaged with the second holder 72. The diameter of the second coil spring 62 is formed smaller than that of the first coil spring 61. Specifically, the diameter of the second coil spring 62 is formed smaller than the inner diameter of the spring seat tubular portion 731.

The second holder 72 is formed in a cylindrical shape and provided inside the tubular portion 711 of the first holder 71. The radially inward inner wall surface 71a of the tubular portion 711 of the first holder 71 and a radially outward outer wall surface 72a of the second holder 72 are in sliding contact. The radially inward inner wall surface 71a of the tubular portion 711 of the first holder 71 and the radially outward outer wall surface 72a of the second holder 72 function as guide surfaces for linear relative movement of the bottom portion 712 of the first holder 71 and the second holder 72 in the direction facing each other.

An engaging groove 721 to lock the end of the second coil spring 62 is provided in the surface of the second holder 72 on the side of the spring seat 73. The end of the second coil spring 62 on the side of the second holder 72 is engaged to the engaging groove 721 to restrict movement in the radial direction. That is, the engaging groove 721 provided in the surface of the second holder 72 on the side of the spring seat 73 functions as a restriction portion which restricts the movement of the second coil spring 62 in the radial direction.

The second holder 72 and the pedal pad 30 are connected by a connecting rod 90. A connecting groove 722 which rotatably connects one end of the connecting rod 90 is provided in the surface of the second holder 72 on the side of the pedal pad 30. One end of the connecting rod 90 is connected to the connecting groove 722 provided in the second holder 72. On the other hand, as shown in FIGS. 3 and 4, the other end of the connecting rod 90 is rotatably connected to a connecting portion 34 provided on the pedal pad 30.

As shown in FIG. 6, in the following description, a surface 732a of the spring seat bottom portion 732 on the leaf spring 51 side is referred to as a "spring seat bottom lower surface 732a". A surface 712a of the bottom portion 712 of the first holder 71 on the spring seat 73 side is referred to as a first holder bottom upper surface 712a". The spring seat bottom lower surface 732a and the first holder bottom upper surface 712a can come into contact with each other when the first coil spring 61 is contracted. Therefore, the spring seat bottom lower surface 732a and the first holder bottom upper surface 712a function as stoppers which regulate the amount of deflection of the first coil spring 61.

Further, in the following description, a surface 733b of the flange portion 733 of the spring seat 73 on the second holder 72 side is referred to as a "flange portion upper surface 733b", and a surface 72b of the second holder 72 on the spring seat 73 side is referred to as a "second holder lower surface 72b". The flange portion upper surface 733b and the second holder lower surface 72b can come into contact with each other when the second coil spring 62 is contracted. Therefore, the flange portion upper surface 733b and the second holder lower surface 72b function as stoppers which regulate the amount of deflection of the second coil spring 62.

In the above-described configuration of pedal device 1, the operation of the reaction force generation mechanism 50 when the driver applies a pedaling force to the pedal pad 30 and the pedal pad 30 rotates toward the floor 2 side or the dash panel side will be described with reference to FIGS. 7 to 9 and FIG. 4. FIG. 8 shows an example of the operation of the reaction force generation mechanism 50. Since the reaction force generation mechanism 50 may operate differently from that shown in FIG. 8, this will also be described together.

Figure 7:
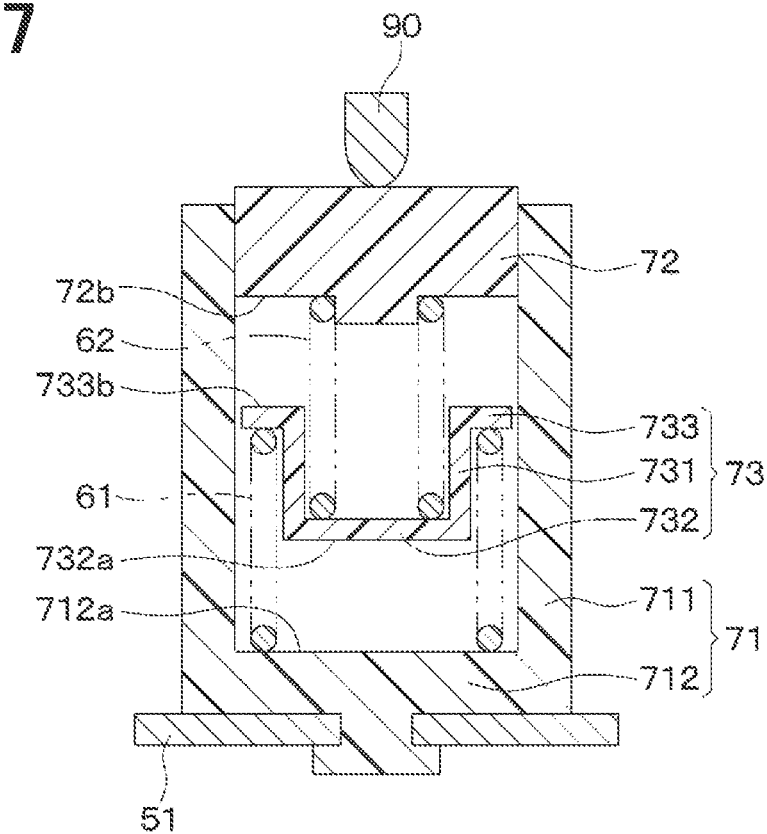
FIG. 7 is an explanatory view for describing the operation of a reaction force generation mechanism in the pedal device according to the first embodiment.
Figure 8:
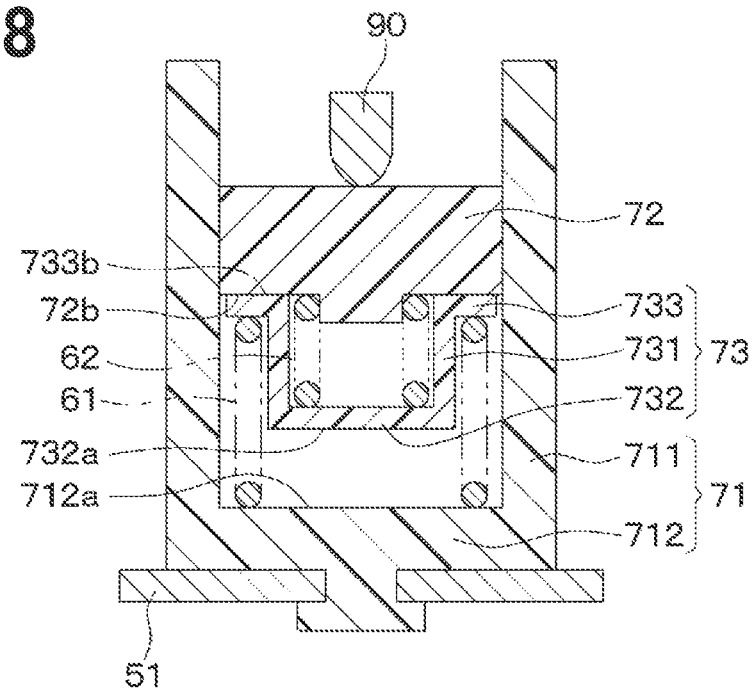
FIG. 8 is an explanatory view for describing the operation of a reaction force generation mechanism in the pedal device according to the first embodiment.

FIG. 7 shows a state in which the pedaling force of the driver is not applied to the pedal pad 30. In this state, the first coil spring 61 and the second coil spring 62 extend in the axial direction. From this state, when the driver applies a pedaling force to the pedal pad 30, the first coil spring 61 and the second coil spring 62 contract in the axial direction, and the portion of the leaf spring 51 which fixes the first holder 71 and the like is also bent so as to approach the floor 2 side or the dash panel side.

Next, as shown in FIG. 8, when the driver gradually increases the pedaling force applied to the pedal pad 30, the amount of contraction of the second coil spring 62 which is the smallest in spring constant among the multiple resilient members becomes the largest. Therefore, the flange portion upper surface 733b and the second holder lower surface 72b are in contact with each other. Thus, the amount of deflection of the second coil spring 62 is regulated.

Although FIG. 8 shows a state in which the flange portion upper surface 733b and the second holder lower surface 72b are in contact with each other, the present invention is not limited to this. Although omitted in the drawing, the spring seat bottom lower surface 732a and the first holder bottom upper surface 712a may come into contact first. It corresponds to, for example, the case where in a state in which the driver's pedaling force is not applied to the pedal pad 30, the gap between the spring seat bottom lower surface 732a and the first holder bottom upper surface 712a is smaller than the gap between the flange portion upper surface 733b and the second holder lower surface 72b. In this case, the spring seat bottom lower surface 732a and the first holder bottom upper surface 712a first come into contact with each other, so that the amount of deflection of the first coil spring 61 is restricted.

Figure 9:
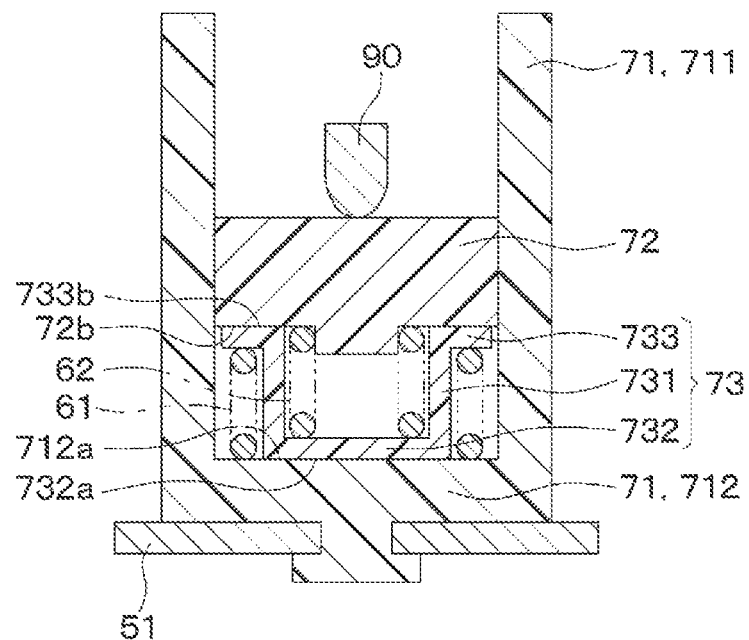
FIG. 9 is an explanatory view for describing the operation of a reaction force generation mechanism in the pedal device according to the first embodiment.

Subsequently, when the driver increases the pedaling force applied to the pedal pad 30 from the state shown in FIG. 8, the contraction amount of the first coil spring 61 among the plurality of resilient members also increases. Therefore, as shown in FIG. 9, the spring seat bottom lower surface 732a and the first holder bottom upper surface 712a abut against each other. Thus, the amount of deflection of the first coil spring 61 is regulated.

Further, as shown in FIG. 4, when the driver further increases the pedaling force applied to the pedal pad 30, the amount of deflection of the leaf spring 51 among the multiple resilient members also increases, and the leaf spring 51 bends so as to approach the portion of the housing 10 on the floor 2 side or the dash panel side. The back surface of the pedal pad 30 and the fully open stopper 33 are brought into abutment with each other. Thus, the maximum rotational position of the pedal pad 30 is defined, and the amount of deflection of the leaf spring 51 is regulated.

Figure 10:
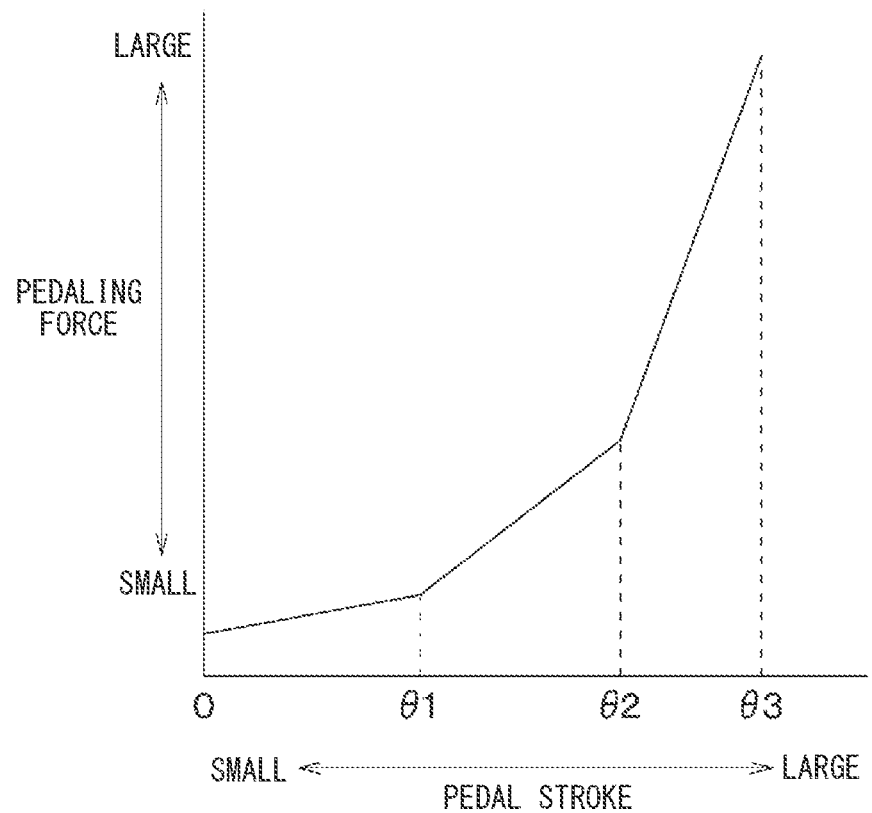
FIG. 10 is a graph showing pedaling force characteristics in the pedal device according to the first embodiment.

FIG. 10 shows an example of the pedaling force of the driver with respect to a stroke amount of the pedal pad 30 (hereinafter referred to as a "pedal stroke") in the pedal device 1 according to the first embodiment.

When the pedal stroke is from 0 to θ1, all the resilient members of the reaction force generation mechanism 50 (i.e., the leaf spring 51, the first coil spring 61, and the second coil spring 62) bend. Therefore, when the pedal stroke is 0 to θ1, the rate of increase in pedaling force when the pedal stroke is from 0 to θ1 becomes relatively small. When the pedal stroke is θ1, as shown in FIG. 8, the flange portion upper surface 733b and the second holder lower surface 72b come into contact with each other, and the amount of deflection of the second coil spring 62 is restricted.

As described above, not only in the state shown in FIG. 8, the spring seat bottom lower surface 732a and the first holder bottom upper surface 712a may come into contact first. In this case, the amount of deflection of the first coil spring 61 is restricted.

Therefore, the amount of deflection of either the first coil spring 61 or the second coil spring 62 is restricted.

When the pedal stroke is from θ1 to θ2, the leaf spring 51 among the multiple resilient members of the reaction force generation mechanism 50, and the coil spring unregulated in deflection amount, of the first coil spring 61 or the second coil spring 62 bends. When the series arrangement of three springs is changed to the series arrangement of two springs, the rate of increase in pedaling force becomes large. Therefore, the rate of increase in the pedaling force when the pedal stroke is between θ1 and θ2 becomes larger than the rate of increase in the pedaling force when the pedal stroke is between 0 and θ1. When the pedal stroke is θ2, as shown in FIG. 9, the spring seat bottom lower surface 732a and the first holder bottom upper surface 712a abut against each other, and hence the amounts of deflection of the first coil spring 61 and the second coil spring 62 are restricted.

When the pedal stroke is from θ2 to θ3, only the leaf spring 51 of the multiple resilient members included in the reaction force generation mechanism 50 bends. Therefore, the rate of increase in the pedaling force when the pedal stroke is between θ2 and θ3 becomes larger than the rate of increase in the pedaling force when the pedal stroke is between θ1 and θ2. That is, in the present embodiment, using the leaf spring 51 in the reaction force generation mechanism 50 makes it possible to obtain a high spring constant in the zone of the pedal stroke from θ2 to θ3. When the pedal stroke is θ3, as shown in FIG. 4, the back surface of the pedal pad 30 and the fully open stopper 33 come into abutment with each other to define the maximum rotational position of the pedal pad 30 and restrict the amount of deflection of the leaf spring 51.

The pedal device 1 of the first embodiment described above brings about the following operative effects.

(1) The reaction force generation mechanism 50 included in the pedal device 1 of the first embodiment includes the multiple resilient members having the predetermined leaf spring 51. According to this, for example, if the resilient member of the reaction force generation mechanism 50 is constituted only of a coil spring, a space corresponding to "wire diameter of coil spring x number of turns" and "the amount of deflection" is required. On the other hand, when the leaf spring 51 is used for the resilient member of the reaction force generation mechanism 50, it is sufficient to have a space corresponding to the "thickness of the leaf spring 51" and the "amount of deflection". Therefore, the space required for installing the leaf spring 51 becomes smaller than the space required for installing the coil spring. Therefore, by using the leaf spring 51 as the resilient member of the reaction force generation mechanism 50, the pedal device 1 can reduce the space on the side opposite to the surface stepped on by the driver in the pedal pad 30. As a result, the present pedal device 1 can be reduced in physical size.

(2) In the first embodiment, the leaf spring 51 of the reaction force generation mechanism 50 is of a flat plate shape and has a shape curved in the longitudinal direction in the state in which no load is applied. The shape of the leaf spring 51 may be a shape in which at least one of the thickness and width of a flat plate gradually changes, or may be formed linear in the longitudinal direction in the state in which no load is applied.

According to this, it is possible to obtain targeted pedaling force characteristics by changing the shape of the leaf spring 51.

(3) In the first embodiment, the resilient members (i.e., the first coil spring 61 and the second coil spring 62) of the multiple resilient members constituting the reaction force generation mechanism 50, other than the predetermined leaf spring 51, are arranged in series at the other end of the predetermined leaf spring 51 in the longitudinal direction.

According to this, it is possible to improve the feeling of stepping on the pedal by arranging the multiple resilient members constituting the reaction force generation mechanism 50 in series.

(4) In the first embodiment, the reaction force generation mechanism 50 includes the first holder 71 which locks one end of the first coil spring 61 in the axial direction, and the second holder 72 which locks the other end of the second coil spring 62 in the axial direction.

According to this, the first holder 71 is arranged at one end of the first coil spring 61 in the axial direction, and the second holder 72 is arranged at the other end of the second coil spring 62 in the axial direction. Consequently, the first coil spring 61 and the second coil spring 62 can be pushed by the first holder 71 and the second holder 72.

(5) In the first embodiment, the reaction force generation mechanism 50 has portions functioning as stoppers in the first holder 71, the spring seat 73, and the second holder 72, respectively. Specifically, the spring seat bottom lower surface 732*a* and the first holder bottom upper surface 712*a* function as stoppers which regulate the amount of deflection of the first coil spring 61. Further, the flange portion upper surface 733*b* and the second holder lower surface 72*b* function as stoppers which regulate the amount of deflection of the second coil spring 62.

According to this, since the amounts of deflection of the first coil spring 61 and the second coil spring 62 can be adjusted, targeted pedaling force characteristics can be obtained.

(6) In the first embodiment, the first holder 71 and the second holder 72 have portions which function as guide surfaces for linear relative movement of the first holder 71 and the second holder 72 in the directions facing each other. Specifically, the radially inward inner wall surface 71*a* of the tubular portion 711 of the first holder 71 and the radially outward outer wall surface 72*a* of the second holder 72 function as guide surfaces for linear relative movement of the first holder 71 and the second holder 72 in the directions facing each other.

According to this, even when the predetermined leaf spring 51 bends, and the angle between the axial centers of the first and second coil springs 61 and 62 arranged between the first holder 71 and the second holder 72 and the pedal pad 30 changes, the first and second coil springs 61 and 62 can be linearly moved. Therefore, the targeted pedaling force characteristics can be obtained.

(7) in the first embodiment, the first holder 71 is of the cylindrical member having the bottom portion 712. Also, the second holder 72 is of the columnar member arranged inside the tubular portion 711 of the first holder 71.

According to this, since the first holder 71 is of the cylindrical member, and the second holder 72 is of the columnar member, none of them are oriented in the circumferential direction, and it is easy to assemble them.

(8) In the first embodiment, the second holder 72 has the portion which functions as the restriction portion that restricts radial movement of the second coil spring 62. Specifically, the engaging groove 721 provided in the second holder lower surface 72*b* functions as the restriction portion which restricts the positional deviation of the second coil spring 62 in the radial direction.

According to this, since the second coil spring 62 is prevented from being displaced in the radial direction, it is possible to obtain the targeted pedaling force characteristics.

(9) In the first embodiment, the resilient members other than the predetermined leaf spring 51 among the multiple resilient members constituting the reaction force generation mechanism 50 are the first coil spring 61 and the second coil spring 62.

According to this, a coil spring is exemplified as the resilient member other than the predetermined leaf spring 51.

(10) In the first embodiment, when a plurality of coil springs are arranged between the first holder 71 and the second holder 72 in the reaction force generation mechanism 50, the reaction force generation mechanism 50 has the spring seat 73 between the first coil spring 61 and the second coil spring 62.

According to this, by arranging the spring seat 73 between the first coil spring 61 and the second coil spring 62, the first coil spring 61 and the second coil spring 62 can be arranged in series.

(11) In the first embodiment, the diameter of the first coil spring 61 and the diameter of the second coil spring 62 are different.

According to this, the first coil spring 61 and the second coil spring 62 can be arranged in a radially overlapped state.

(12) In the first embodiment, the spring seat 73 includes the cylindrical spring seat tubular portion 731, the flange portion 733 provided so as to expand radially outward from one end of the spring seat tubular portion 731 in the axial direction, and the spring seat bottom portion 732 provided at the other end of the spring seat tubular portion 731 in the axial direction.

Thus, the first coil spring 61 is arranged between the flange portion 733 of the spring seat 73 and the first holder 71, and the second coil spring 62 is arranged between the spring seat bottom portion 732 and the second holder 72, so that the maximum amounts of deflection of the first coil spring 61 and the second coil spring 62 can be adjusted respectively. Consequently, it is possible to obtain pedaling force characteristics having a plurality of bending points.

(13) In the first embodiment, the radially inward inner wall surface 731*b* of the spring seat tubular portion 731 and the radially outward outer wall surface 731*a* thereof function as the guide surfaces which guide the coil springs to bend in the axial direction while restricting the axial movement of the first coil spring 61 and the second coil spring 62.

According to this, since both the first coil spring 61 and the second coil spring 62 (i.e., the plural coil springs) are bent in the axial direction, it is possible to obtain targeted pedaling force characteristics.

(14) In the first embodiment, the radially outward outer wall surface 733*a* of the flange portion 733 included in the spring seat 73 is formed as a curved surface which protrudes radially outward. A predetermined gap G1 is provided between the outer wall surface 733*a* and the inner wall surface 71*a* of the tubular portion 711 of the first holder 71.

According to this, even when the leaf spring 51 is bent, it is possible to prevent the friction between the inner wall surface 71*a* of the tubular portion 711 of the first holder 71 and the outer wall surface 733*a* of the flange portion 733 of the spring seat 73 from increasing. Therefore, targeted pedaling force characteristics can be obtained.

(15) In the first embodiment, the reaction force generation mechanism 50 is arranged inside the housing 10.

According to this, it is possible to prevent foreign matter from entering the reaction force generation mechanism 50 from the outside of the housing 10.

(16) In the first embodiment, the housing 10 is fixed with the screws 3 to the floor 2 or the dash panel in the interior of the vehicle body.

According to this, the housing 10 can be reliably fixed to the floor 2 or the dash panel in the interior of the vehicle body so as not to move.

(17) In the first embodiment, one end of the leaf spring 51 in the longitudinal direction is arranged in the region closer to the floor 2 side or the dash panel side in the vehicle interior than the rotational axis CL of the pedal pad 30.

According to this, the leaf spring 51 is arranged in the space on the side opposite to the surface of the pedal pad 30 which is stepped on by the driver, from one end thereof to the other end. Therefore, by using the leaf spring 51 in the reaction force generation mechanism 50, it is possible to reduce the space on the side opposite to the surface stepped on by the driver in the pedal pad 30. Thus, the pedal device 1 can be reduced in size.

(18) In the first embodiment, one end of the predetermined leaf spring 51 is attached to the portion of the housing 10 on the side of the floor 2 or the dash panel in the vehicle interior, or attached to the floor 2 or the dash panel in the vehicle interior.

According to this, since the configuration is adopted in which one end of the predetermined leaf spring 51 is supported by the vehicle body through the housing 10 or directly supported by the vehicle body, it is possible to increase the rigidity of the mounting portion of the leaf spring 51.

Second to Eighteenth Embodiments

In second to eighteenth embodiments, the configuration of the reaction force generation mechanism 50 is changed with respect to the first embodiment, and others are the same as in the first embodiment. Therefore, only parts different from those in the first embodiment will be described. In the drawings referred to in the second to eighteenth embodiments, each configuration of the pedal device 1 is shown in a simplified manner.

Second Embodiment

Figure 11:
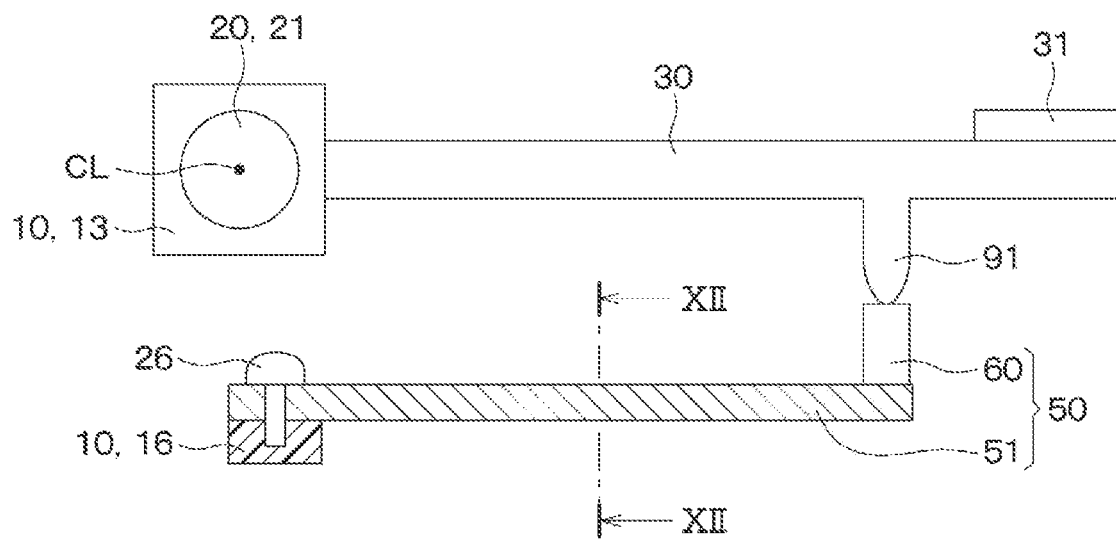
FIG. 11 is a schematic view of a pedal device according to a second embodiment.

As shown in FIG. 11, the pedal device 1 of the second embodiment also includes a housing 10, a shaft 20, a pedal pad 30, a sensor unit, and a reaction force generation mechanism 50, etc.

The housing 10 is attached to the floor or dash panel in a vehicle interior. In FIG. 11, only a part of the housing 10 is simplified and displayed. This is also the same for the drawings referred to in the third to eighteenth embodiments to be described later.

A shaft portion 21 of the shaft 20 is rotatably supported by a shaft receiving portion 13 of the housing 10. It is assumed that the pedal pad 30 has one end in the longitudinal direction which is fixed to the shaft 20. Therefore, the pedal pad 30 can rotate about the center of the shaft receiving portion 13 as a rotational axis CL. A thick portion 31 is provided at the other end of the pedal pad 30 in the longitudinal direction as a portion to be stepped on by a driver.

In FIG. 11, the pedal pad 30 in a state in which the driver's pedaling force is not applied is described horizontally on the surface of paper, but this is shown schematically. For example, when the pedal device 1 is of an organ type, the pedal pad 30 is arranged so that the thick portion 31 to be stepped on by the driver is above relative to the rotational axis CL in the vertical direction when mounted on the vehicle. Further, for example, when the pedal device 1 is of a pendant type, the pedal pad 30 is arranged such that the thick portion 31 to be stepped on by the driver is below relative to the rotational axis CL in the vertical direction when mounted on the vehicle. This is also the same for the drawings referred to in the third to eighteenth embodiments to be described later.

The rotational angle of the pedal pad 30 and the shaft 20 (i.e., the pedal rotational angle) is detected by the unillustrated sensor unit. The sensor unit outputs an electric signal corresponding to the pedal rotational angle to an electronic control device of the vehicle.

The reaction force generation mechanism 50 is provided in a region on the side opposite to the surface of the pedal pad 30 to be stepped on by the driver. The reaction force generation mechanism 50 generates a reaction force against the pedaling force applied to the pedal pad 30 by the driver. In the second embodiment, the reaction force generation mechanism 50 is constituted of a leaf spring 51 and a resilient member 60, etc.

Figure 12:
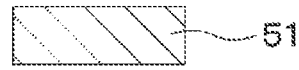
FIG. 12 is a cross-sectional view taken along line XII-XII of FIG. 11.

In the second embodiment, the leaf spring 51 has a constant plate thickness from one longitudinal end to the other longitudinal end, and is formed linear in the longitudinal direction in a state in which no load is applied. Further, as shown in FIG. 12, the leaf spring 51 is rectangular in cross section perpendicular to the longitudinal direction, and has a constant plate width from one side to the other side in the plate thickness direction.

As shown in FIG. 11, one end of the leaf spring 51 in the longitudinal direction is arranged in a region on the floor side or the dash panel side of the vehicle interior with respect to the rotational axis CL of the pedal pad 30. One end of the leaf spring 51 in the longitudinal direction is attached by a bolt 26 or the like to a fixing base 16 provided in a portion of the housing 10 on the floor side or the dash panel side of the vehicle interior.

Although FIG. 11 shows a configuration in which one end of the leaf spring 51 is attached to the fixing base 16 of the housing 10, the configuration is not limited to this, and one end of the leaf spring 51 may be fixed directly to the floor or the dash panel of the vehicle interior. This also applies to the third to eighteenth embodiments to be described later.

A resilient member 60 which constitutes a part of the reaction force generation mechanism 50 is provided at the other end of the leaf spring 51 in the longitudinal direction. That is, in the second embodiment as well, the reaction force generation mechanism 50 has a configuration in which a predetermined leaf spring 51 and a resilient member 60 other than the predetermined leaf spring 51 are arranged in series. A coil spring or the like is exemplified as the resilient member 60. The resilient member 60 is not limited to one coil spring, and may be a combination of, for example, a plurality of coil springs, holders, and spring seats, etc. as described in the first embodiments. The resilient member 60 is in abutment with an abutment pin 91 provided on the pedal pad 30. Instead of the abutment pin 91, the connecting rod 90 described in the first embodiment may be provided.

Also in the second embodiment, when the driver steps on the pedal pad 30, a load is applied from the pedal pad 30 to the resilient member 60 and the leaf spring 51 via the abutment pin 91. Thus, the resilient member 60 contracts in its own axial direction, and the leaf spring 51 also bends so that the portion of fixing the resilient member 60 approaches the floor side or the dash panel side. Consequently, the pedal device 1 of the second embodiment can also obtain targeted pedaling force characteristics by means of the leaf spring 51 and the resilient member 60. The pedal device 1 of the second embodiment described above can also bring about the same operative effects as those of the first embodiment.

Third Embodiment

Figure 13:
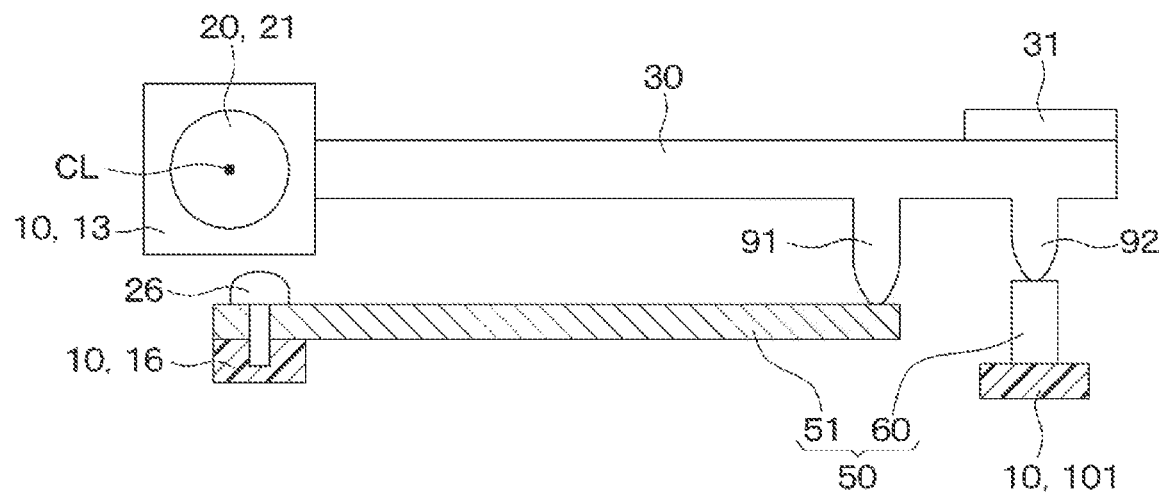
FIG. 13 is a schematic view of a pedal device according to a third embodiment.

As shown in FIG. 13, in the third embodiment, there is shown a configuration in which a leaf spring 51 and a resilient member 60 constituting a reaction force generation mechanism 50 are arranged in parallel. In the present specification, the parallel arrangement means that a portion in which a predetermine leaf spring 51 is fixed to a housing 10 or a vehicle body, and a portion in which the resilient member 60 other than the predetermined leaf spring 51 is fixed to the housing 10 or the vehicle body are arranged to be different from each other.

One end of the leaf spring 51 in the longitudinal direction is arranged in a region of a pedal pad 30 on the floor side or the dash panel side of a vehicle interior with respect to a rotational axis CL. One end of the leaf spring 51 in the longitudinal direction is attached to a fixing base 16 of the housing 10 with a bolt 26 or the like. The other end of the leaf spring 51 in the longitudinal direction is in abutment with a first abutment pin 91 provided on the pedal pad 30.

One end of the resilient member 60 in the axial direction is attached to a portion 101 of the housing 10, which is separate from the fixing base 16. The other end of the resilient member 60 in the axial direction abuts on a second abutment pin 92 provided on the pedal pad 30.

In the configuration of the third embodiment, when the driver steps on the pedal pad 30, a load is applied from the pedal pad 30 to the leaf spring 51 via the first abutment pin 91, and a load is also applied from the pedal pad 30 to the resilient member 60 via the second abutment pin 92. Consequently, the leaf spring 51 bends to approach the floor side or the dash panel side, and the resilient member 60 also contracts in its own axial direction. Consequently, the pedal device 1 of the third embodiment can also obtain targeted pedaling force characteristics by means of the leaf spring 51 and the resilient member 60.

The pedal device 1 of the third embodiment described above can also bring about the same operative effects as those of the first embodiment and the like. Further, in the third embodiment, it becomes easier to arrange the leaf spring 51 and the resilient member 60 by arranging the leaf spring 51 and the resilient member 60 constituting the reaction force generation mechanism 50 in parallel.

Fourth Embodiment

Figure 14:
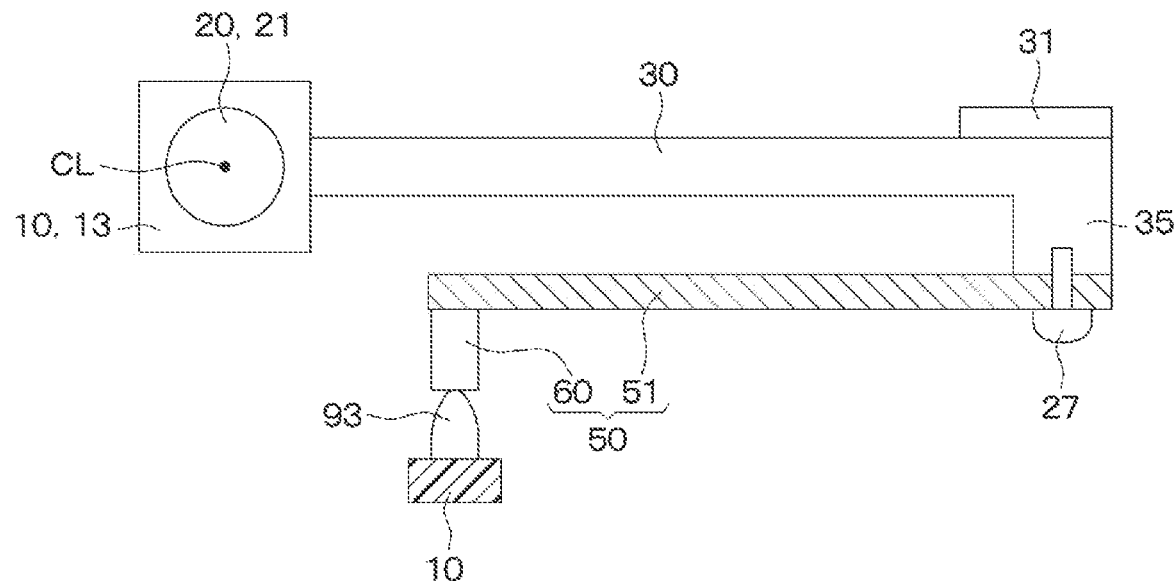
FIG. 14 is a schematic view of a pedal device according to a fourth embodiment.

As shown in FIG. 14, the fourth embodiment shows a change of a mounting method of the leaf spring 51 and the resilient member 60 constituting the reaction force generation mechanism 50 from the second embodiment. Also in the fourth embodiment, there is shown a configuration in which the leaf spring 51 and the resilient member 60 constituting the reaction force generation mechanism 50 are arranged in series.

The resilient member 60 constituting a part of the reaction force generation mechanism 50 is provided on the surface of one longitudinal end of the leaf spring 51, which is on the side opposite to the pedal pad 30. The resilient member 60 has one end in the axial direction connected to the leaf spring 51. Further, the resilient member 60 has the other end in the axial direction, which is in abutment with an abutment pin 93 provided on the housing 10.

The other end of the leaf spring 51 in the longitudinal direction is fixed by a bolt 27 or the like to a mounting portion 35 provided at a portion of the pedal pad 30 far from the rotational axis CL.

Also in the fourth embodiment, when the driver steps on the pedal pad 30, a load is applied from the pedal pad 30 to the leaf spring 51 and the resilient member 60. Consequently, the leaf spring 51 bends to approach the floor side or the dash panel side, and the resilient member 60 also contracts in its own axial direction. Consequently, the pedal device 1 of the fourth embodiment can also obtain targeted pedaling force characteristics by means of the leaf spring 51 and the resilient member 60.

The pedal device 1 of the fourth embodiment described above can also bring about the same operative effects as those of the first embodiment and the like.

Fifth Embodiment

Figure 15:
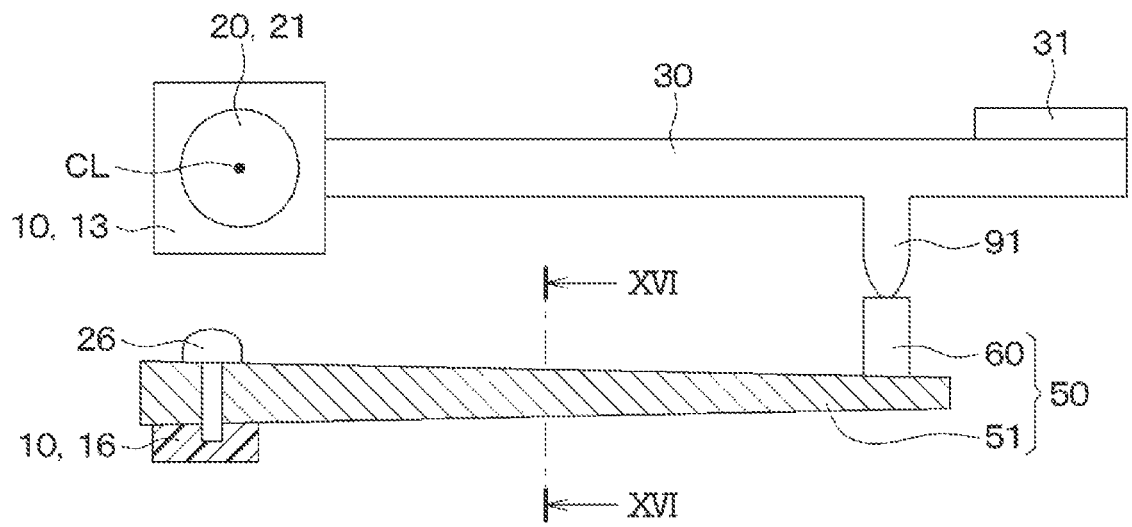
FIG. 15 is a schematic view of a pedal device according to a fifth embodiment.
Figure 16:
FIG. 16 is a cross-sectional view taken along line XVI-XVI of FIG. 15.

As shown in FIG. 15, the fifth embodiment shows a change of the shape of a leaf spring 51 constituting a reaction force generation mechanism 50 from the second embodiment. The leaf spring 51 has a shape in which its plate thickness gradually changes from one end in the longitudinal direction to the other end in the longitudinal direction. Further, as shown in FIG. 16, the leaf spring 51 is trapezoidal in cross section perpendicular to the longitudinal direction, that is, the leaf spring 51 has a shape in which its plate width gradually changes from one side to the other side in the plate thickness direction. Consequently, the pedal device 1 of the fifth embodiment can also obtain targeted pedaling force characteristics by means of the shape-changed leaf spring 51 and the resilient member 60.

The pedal device 1 of the fifth embodiment described above can also bring about the same operative effects as those of the first embodiment and the like.

Sixth Embodiment

Figure 17:
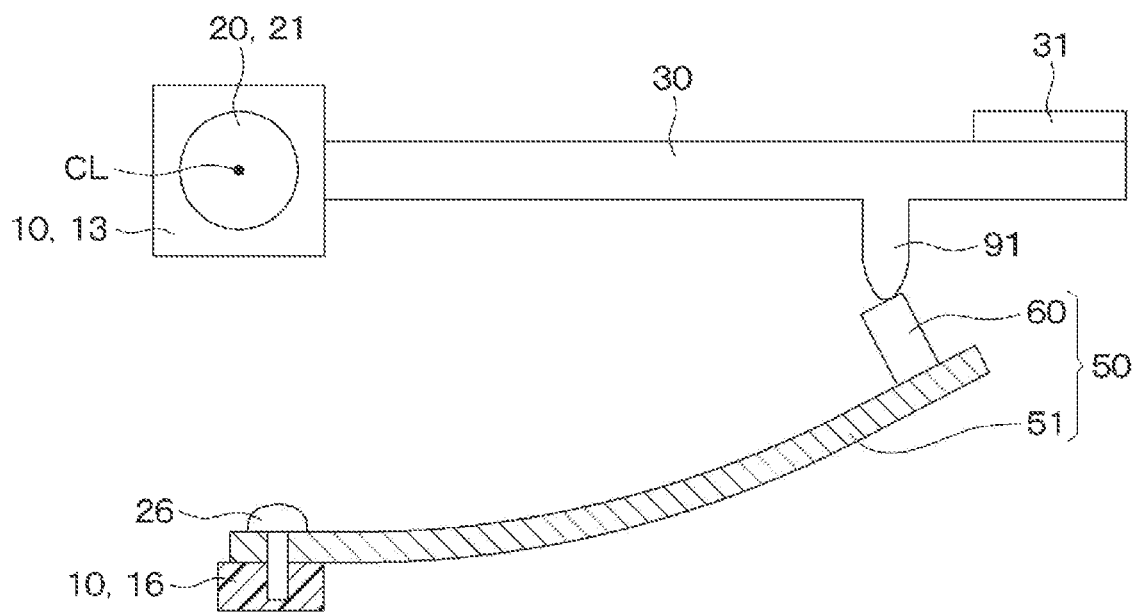
FIG. 17 is a schematic view of a pedal device according to a sixth embodiment.

As shown in FIG. 17, the sixth embodiment shows a change of the shape of a leaf spring 51 constituting a reaction force generation mechanism 50 from the second embodiment. The leaf spring 51 has a curved shape whose longitudinal direction is convex toward the floor side in a state of not receiving the load. The leaf spring 51 can adopt various shapes so as to match the size and shape of a space on the side opposite to the surface stepped on by a driver in a pedal pad 30. The pedal device 1 of the sixth embodiment can also obtain targeted pedaling force characteristics by the curved leaf spring 51 and a resilient member 60.

The pedal device 1 of the sixth embodiment described above can also bring about the same operative effects as those of the first embodiment and the like.

Seventh Embodiment

Figure 18:
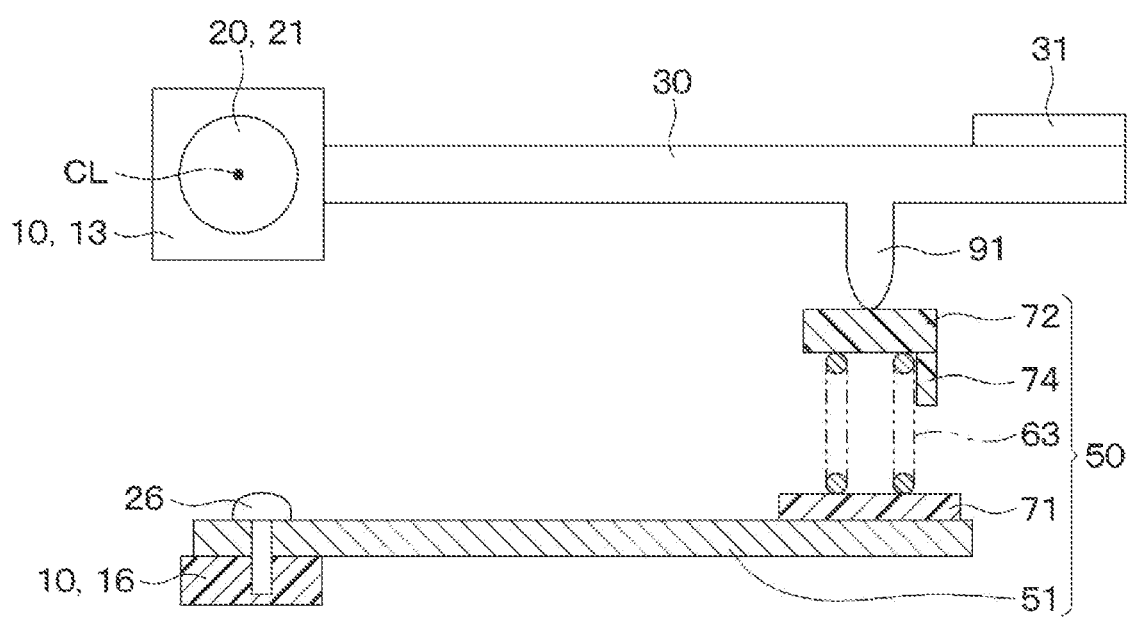
FIG. 18 is a schematic view of a pedal device according to a seventh embodiment.

As shown in FIG. 18, the seventh embodiment shows a change of a part of the configuration of the reaction force generation mechanism 50 from the second embodiment. In the seventh embodiment, the reaction force generation mechanism 50 is constituted of a leaf spring 51, a coil spring 63, a first holder 71, and a second holder 72, etc.

One end of the leaf spring 51 in the longitudinal direction is attached to a fixing base 16 of a housing 10 with a bolt 26 or the like. The first holder 71, the coil spring 63, and the second holder 72 are provided in this order at the other end of the leaf spring 51 in the longitudinal direction.

The first holder 71 is formed, for example, in a disk shape and is fixed to the other end of the leaf spring 51 in the longitudinal direction. The coil spring 63 has one axial end engaged to the first holder 71 and the other axial end engaged to the second holder 72. The second holder 72 is formed, for example, in a disk shape. The second holder 72 is in abutment with an abutment pin 91 provided on a pedal pad 30.

Also, the second holder 72 has a stopper 74. The stopper 74 extends from the surface of the second holder 72 on the first holder 71 side toward the first holder 71 side. The stopper 74 can restrict the amount of deflection of the coil spring 63 by coming into abutment with the first holder 71 when the coil spring is bent.

Also in the seventh embodiment, when the driver steps on the pedal pad 30, a load is applied from the pedal pad 30 to the coil spring 63 and the leaf spring 51 via the abutment pin 91. Thus, the coil spring 63 contracts in the axial direction, and the lead spring 51 also bends so that a portion to fix the first holder 71 and the like approaches the floor side or the dash panel side. When the pedal stroke reaches a predetermined size, the stopper 74 and the first holder 71 come into abutment with each other, and thereby the amount of deflection of the coil spring 63 is restricted. After that, when the pedal stroke further increases, only the leaf spring 51 bends. The pedal device 1 of the seventh embodiment can also obtain targeted pedaling force characteristics by the leaf spring 51 and the coil spring 63.

The pedal device 1 of the seventh embodiment described above can also bring about the same operative effects as those of the first embodiment and the like.

Eighth Embodiment

Figure 19:
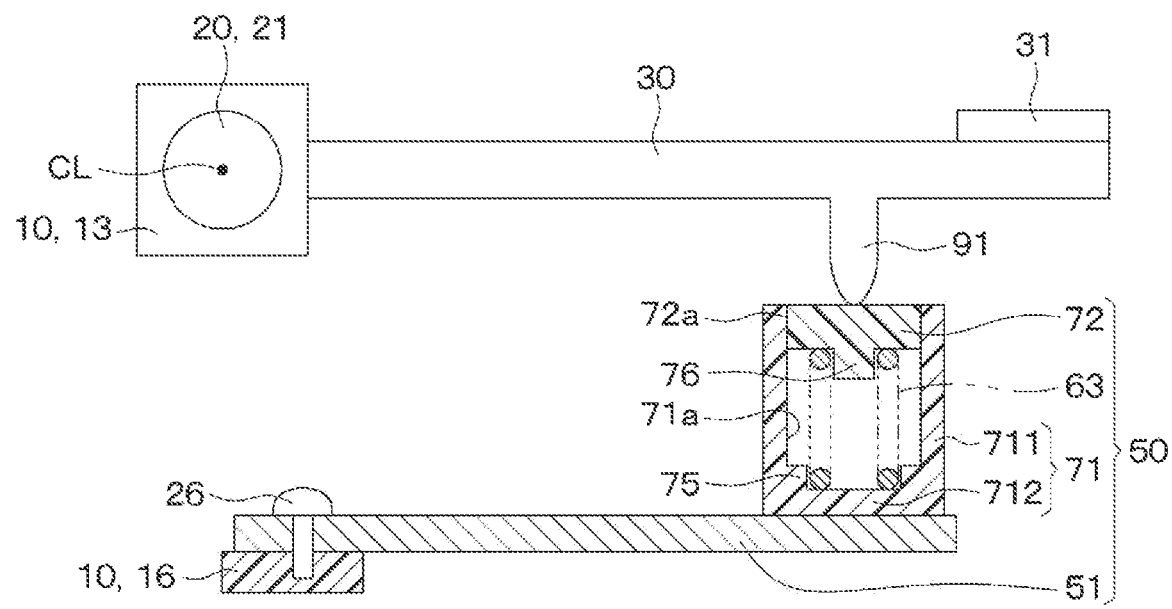
FIG. 19 is a schematic view of a pedal device according to an eighth embodiment.

As shown in FIG. 19, the eighth embodiment also shows a change of the configuration of the reaction force generation mechanism 50 from the second embodiment. Also in the eighth embodiment, the reaction force generation mechanism 50 is constituted of a leaf spring 51, a coil spring 63, a first holder 71, and a second holder 72, etc.

One end of the leaf spring 51 in the longitudinal direction is attached to the fixing base 16 of the housing 10 with the bolt 26 or the like. The first holder 71, the coil spring 63, and the second holder 72 are provided in this order at the other end of the leaf spring 51 in the longitudinal direction.

The first holder 71 is formed in a bottomed cylindrical shape, and has a cylindrical tubular portion 711 and a bottom portion 712 provided at the end of the tubular portion 711 on the leaf spring 51 side. The bottom portion 712 of the first holder 71 is fixed to the other end of the leaf spring 51 in the longitudinal direction by unillustrated bolts or rivets.

The coil spring 63 has one axial end engaged to the first holder 71 and the other axial end engaged to the second holder 72.

The second holder 72 is formed in a cylindrical shape and provided inside the tubular portion 711 of the first holder 71. The radially inward inner wall surface 71a of the tubular portion 711 of the first holder 71 and the radially outward outer wall surface 72a of the second holder 72 are in sliding contact. The radially inward inner wall surface 71a of the tubular portion 711 of the first holder 71 and the radially outward outer wall surface 72a of the second holder 72 function as guide surfaces for linear relative movement of the bottom portion 712 of the first holder 71 and the second holder 72 in the direction facing each other.

Further, in the eighth embodiment, the first holder 71 has a first restriction portion 75 which restricts the radial displacement of one end of the coil spring 63 in the axial direction. The first restriction portion 75 is provided so as to surround one end of the coil spring 63 in the axial direction.

Further, the second holder 72 has a second restriction portion 76 which restricts the radial displacement of the other end of the coil spring 63 in the axial direction. The second restriction portion 76 is provided inside the other end of the coil spring 63 in the axial direction. Thus, in the pedal device 1 of the eighth embodiment as well, the radial displacement of the coil spring 63 is restricted, so that targeted pedaling force characteristics can be obtained by the coil spring 63 and the leaf spring 51.

The pedal device 1 of the eighth embodiment described above can also bring about the same operative effects as those of the first embodiment and the like.

Ninth Embodiment

Figure 20:
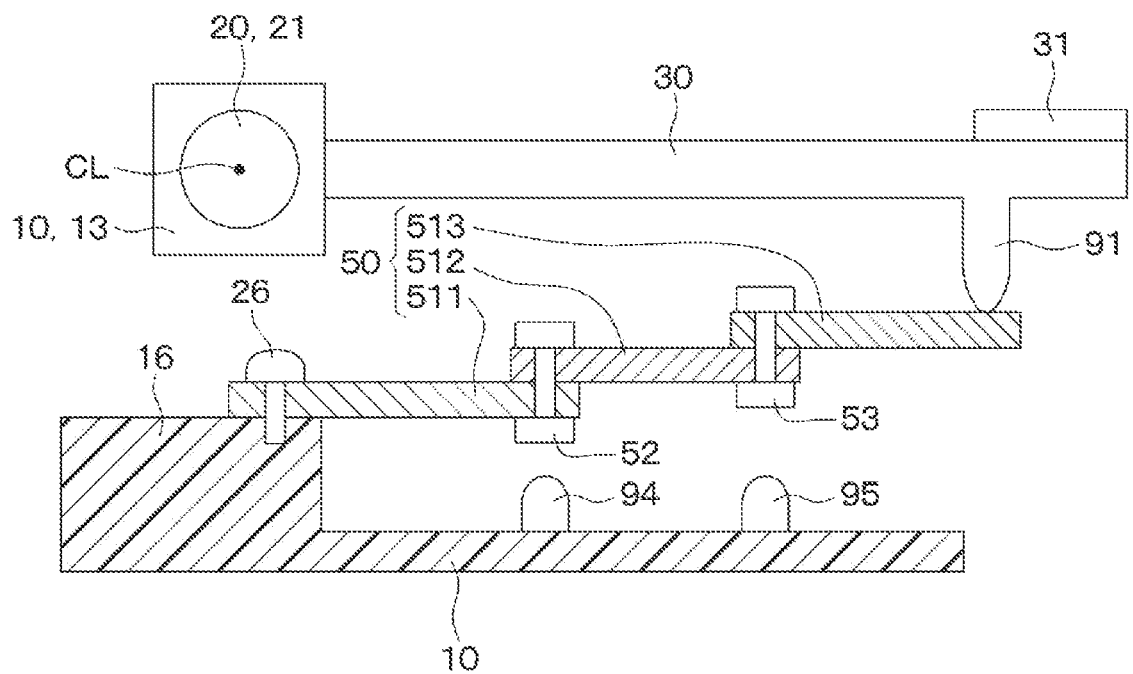
FIG. 20 is a schematic view of a pedal device according to a ninth embodiment.

As shown in FIG. 20, in ninth embodiment, a reaction force generation mechanism 50 is configured by plurality of leaf springs. In the ninth embodiment, the reaction force generation mechanism 50 is constituted of a first leaf spring 511, a second leaf spring 512, a third leaf spring 513, and the like. The number of the leaf springs constituting the reaction force generation mechanism 50 is not limited to three, and may be two or four or more.

On end of the first leaf spring 511 in the longitudinal direction is fixed to a fixing base 16 of a housing 10 with a bolt 26 or the like. The other end of the first leaf spring 511 in the longitudinal direction and one end of the second leaf spring 512 in the longitudinal direction are fastened by a first fastening bolt 52 or the like. The other end of the second leaf spring 512 in the longitudinal direction and one end of the third leaf spring 513 in the longitudinal direction are fastened by a second fastening bolt 53 or the like. The other end of the third leaf spring 513 in the longitudinal direction is in abutment with an abutment pin 91 provided on a pedal pad 30.

A first lower abutment pin 94 is provided inside the housing 10 at a position corresponding to the first fastening bolt 52. A predetermined gap is provided between the first fastening bolt 52 and the first lower abutment pin 94 in a state in which a driver's pedaling force is not applied to the pedal pad 30.

A second lower abutment pin 95 is provided inside the housing 10 at a position corresponding to the second fastening bolt 53. A predetermined gap is provided between the second fastening bolt 53 and the second lower abutment pin 95 in a state in which no driver's pedaling force is applied to the pedal pad 30. The interval between the second fastening bolt 53 and the second lower abutment pin 95 is set larger than the interval between the first fastening bolt 52 and the first lower abutment pin 94.

In the configuration of the ninth embodiment, when the driver steps on the pedal pad 30, a load is applied from the pedal pad 30 to the first to third leaf springs 511, 512, and 513 via the abutment pin 91. Thus, the first to third leaf springs 511, 512, and 513 bend so as to approach the floor side or the dash panel side with one longitudinal end of the first leaf spring 511 (i.e., the portion of the first leaf spring 511 fixed to the fixing base 16) as a fixed end.

When the pedal stroke reaches a predetermined size, the first fastening bolt 52 and the first lower abutment pin 94 abut against each other, and the amount of deflection of the first leaf spring 511 is restricted. After that, when the pedal stroke further increases, the second leaf spring 512 and the third leaf spring 513 bend. When the second fastening bolt 53 and the second lower abutment pin 95 abut against each other, the amount of deflection of the second leaf spring 512 is restricted. After that, when the pedal stroke further increases, only the third leaf spring 513 bends. Thus, in the pedal device 1 of the ninth embodiment, it is possible to obtain targeted pedaling force characteristics with a high spring constant by arranging the first to third leaf springs 511, 512, and 513 in series. Further, the pedal device 1 of the ninth embodiment includes the first and second lower abutment pins 94 and 95 which restrict the amounts of deflection of the first and second leaf springs 511 and 512. Therefore, by defining the amounts of deflection of the first and second leaf springs 511 and 512, it is possible to change the spring characteristics in the middle of the pedal stroke, thereby obtaining targeted pedaling force characteristics.

The pedal device 1 of the ninth embodiment described above can also bring about the same operative effects as those of the first embodiment and the like.

Tenth Embodiment

Figure 21:
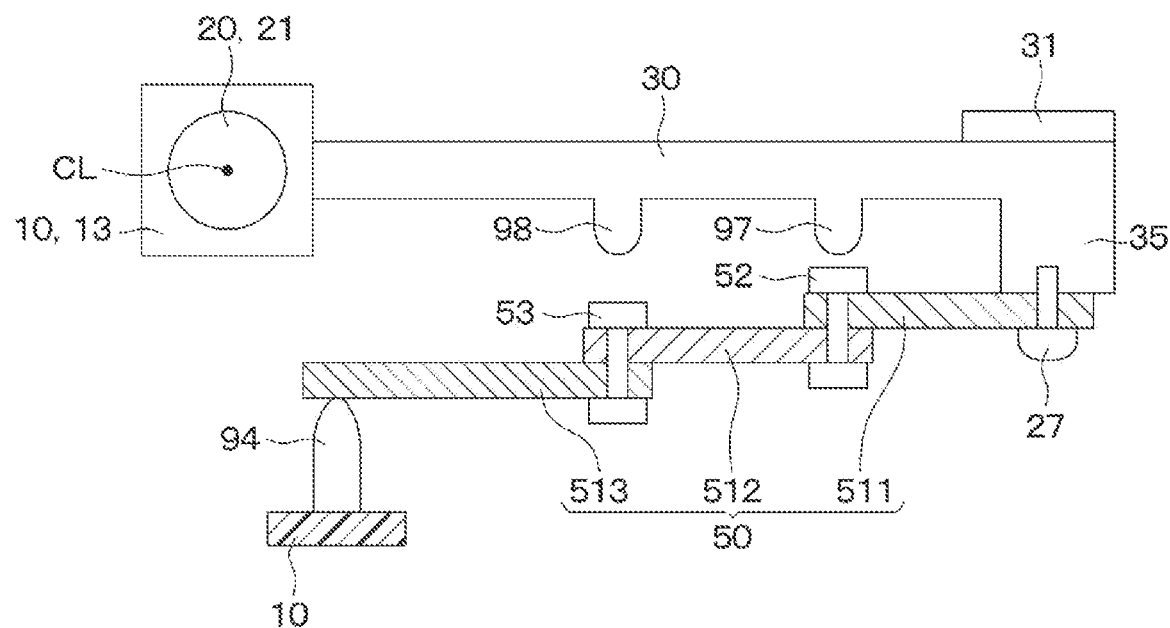
FIG. 21 is a schematic view of a pedal device according to a tenth embodiment.

As shown in FIG. 21, in the tenth embodiment as well, a reaction force generation mechanism 50 is constituted of a plurality of leaf springs. However, in the tenth embodiment, the arrangement of the first leaf spring 511, the second leaf spring 512, and the third leaf spring 513 described in the ninth embodiment is reversed in the longitudinal direction.

One end of the first leaf spring 511 in the longitudinal direction is fixed by a bolt 27 or the like to a mounting portion 35 provided at a portion of a pedal pad 30 far from a rotational axis CL. The other end of the first leaf spring 511 in the longitudinal direction and one end of the second leaf spring 512 in the longitudinal direction are fastened by a first fastening bolt 52 or the like. The other end of the second leaf spring 512 in the longitudinal direction and one end of the third leaf spring 513 in the longitudinal direction are fastened by a second fastening bolt 53 or the like. The other end of the third leaf spring 513 in the longitudinal direction is in abutment with a lower abutment pin 94 provided on a housing 10.

A first upper abutment pin 97 is provided on the back surface of the pedal pad 30 at a position corresponding to a first fastening bolt 52. A predetermined gap is provided between the first fastening bolt 52 and the first upper abutment pin 97 in a state in which no driver's pedaling force is applied to the pedal pad 30.

A second upper abutment pin 98 is provided on the back surface of the pedal pad 30 at a position corresponding to a second fastening bolt 53. A predetermined gap is provided between the second fastening bolt 53 and the second upper abutment pin 98 in a state in which no driver's pedaling force is applied to the pedal pad 30. The interval between the second fastening bolt 53 and the second upper abutment pin 98 is set larger than the interval between the first fastening bolt 52 and the first upper abutment pin 97.

In the configuration of the tenth embodiment, when the driver steps on the pedal pad 30, a load is applied from the pedal pad 30 to the first to third leaf springs 511, 512, and 513. Thus, the first to third leaf springs 511, 512, and 513 bend so as to approach the floor side or the dash panel side with one longitudinal end of the first leaf spring 511 (i.e., the portion of the first leaf spring 511 fixed to the mounting portion 35 of the pedal pad 30) as a fixed end.

When the pedal stroke reaches a predetermined size, the first fastening bolt 52 and the first lower abutment pin 97 abut against each other, and the amount of deflection of the first leaf spring 511 is restricted. After that, when the pedal stroke further increases, the second leaf spring 512 and the third leaf spring 513 bend. When the second fastening bolt 53 and the second upper abutment pin 98 abut against each other, the amount of deflection of the second leaf spring 512 is restricted. After that, when the pedal stroke further increases, only the third leaf spring 513 bends. Thus, in the pedal device 1 of the ninth embodiment as well, it is possible to obtain targeted pedaling force characteristics with a high spring constant by arranging the first to third leaf springs 511, 512, and 513 in series. Further, the pedal device 1 of the tenth embodiment also includes the first and second upper abutment pins 97 and 98 which restrict the amounts of deflection of the first and second leaf springs 511 and 512. Therefore, by defining the amounts of deflection of the first and second leaf springs 511 and 512, it is possible to change the spring characteristics in the middle of the pedal stroke, thereby obtaining targeted pedaling force characteristics.

The pedal device 1 of the tenth embodiment described above can also bring about the same operative effects as those of the first embodiment and the like.

Eleventh Embodiment

Figure 22:
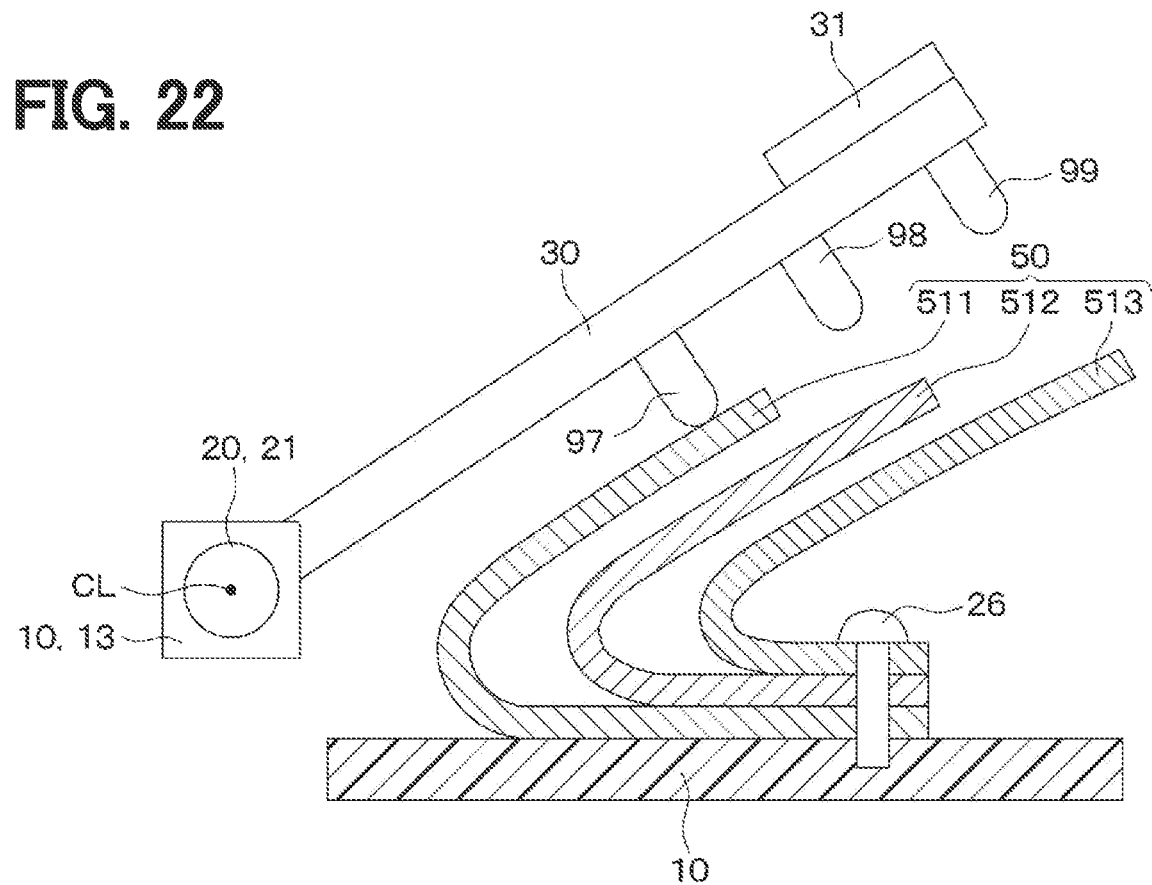
FIG. 22 is a schematic view of a pedal device according to an eleventh embodiment.

As shown in FIG. 22, in the eleventh embodiment as well, a reaction force generation mechanism 50 is constituted of a plurality of leaf springs. In the eleventh embodiment, any of the first leaf spring 511, the second leaf spring 512, and the third leaf spring 513 constituting the reaction force generation mechanism 50 has a curved shape which is made convexly to the rotational axis CL side of the pedal pad 30. The curved portion of the second leaf spring 512 is arranged inside the curved portion of the first leaf spring 511, and the curved portion of the third leaf spring 513 is arranged inside the curved portion of the second leaf spring 512. The number of the leaf springs constituting the reaction force generation mechanism 50 is not limited to three, and may be two or four or more.

One end of each of the first to third leaf springs 511, 512, and 513 in the longitudinal direction is fixed to a portion of the housing 10 on the floor side or the dash panel side of a vehicle interior with a bolt 26 or the like.

A first upper abutment pin 97 is provided on the back surface of the pedal pad 30 at a position corresponding to the first leaf spring 511. The first leaf spring 511 and the first upper abutment pin 97 are in abutment with each other in a state in which no driver's pedaling force is applied to the pedal pad 30.

A second upper abutment pin 98 is provided on the back surface of the pedal pad 30 at a position corresponding to the second leaf spring 512. A predetermined gap is provided between the second leaf spring 512 and the second upper abutment pin 98 in a state in which no driver's pedaling force is applied to the pedal pad 30.

The third upper abutment pin 99 is provided on the back surface of the pedal pad 30 at a position corresponding to the third leaf spring 513. A predetermined gap is provided between the third leaf spring 513 and the third upper abutment pin 99 in a state in which no driver's pedaling force is applied to the pedal pad 30. The gap between the third leaf spring 513 and the third upper abutment pin 99 is set larger than the gap between the second leaf spring 512 and the second upper abutment pin 98.

In the configuration of the eleventh embodiment, when the driver steps on the pedal pad 30, a load is applied from the pedal pad 30 to the first leaf spring 511 via the first upper abutment pin 97. Thus, in the first leaf spring 511, the radius of curvature of the curved portion thereof becomes smaller, and the portion closer to the pedal pad 30 side than the curved portion bends so as to approach the floor side or the dash panel side.

When the pedal stroke reaches a predetermined size, the second leaf spring 512 and the second upper abutment pin 98 come into abutment with each other. When the pedal stroke further increases from there, the first leaf spring 511 and the second leaf spring 512 bend.

After that, when the pedal stroke reaches another predetermined size larger than the predetermined size, the third leaf spring 513 and the third upper abutment pin 99 abut against each other. When the pedal stroke further increases from there, the first leaf spring 511, the second leaf spring 512, and the third leaf spring 513 bend. Thus, even in the pedal device 1 of the eleventh embodiment, targeted pedaling force characteristics can be obtained with a high spring constant by using a plurality of leaf springs in the reaction force generation mechanism 50.

Further, the pedal device 1 of the eleventh embodiment includes the first to third upper abutment pins 97, 98, and 99 which abut against the first to third leaf springs 511, 512, and 513 with a predetermined pedal stroke. Therefore, as the rotational angle of the pedal pad 30 increases, the first to third leaf springs 511, 512, and 513 sequentially apply a reaction force to the pedal pad 30. Accordingly, it is possible to change the spring characteristics in the middle of the pedal stroke, so that targeted pedaling force characteristics can be obtained.

Further, in the pedal device 1 of the eleventh embodiment, the first to third leaf springs 511, 512, and 513 can be arranged closer to each other by arranging the curved portion of another leaf spring inside the curved portion of the predetermined leaf spring, so that the physical size of the pedal device 1 can be reduced.

The pedal device 1 of the eleventh embodiment described above can also bring about the same operative effects as those of the first embodiment and the like.

Twelfth Embodiment

Figure 23:
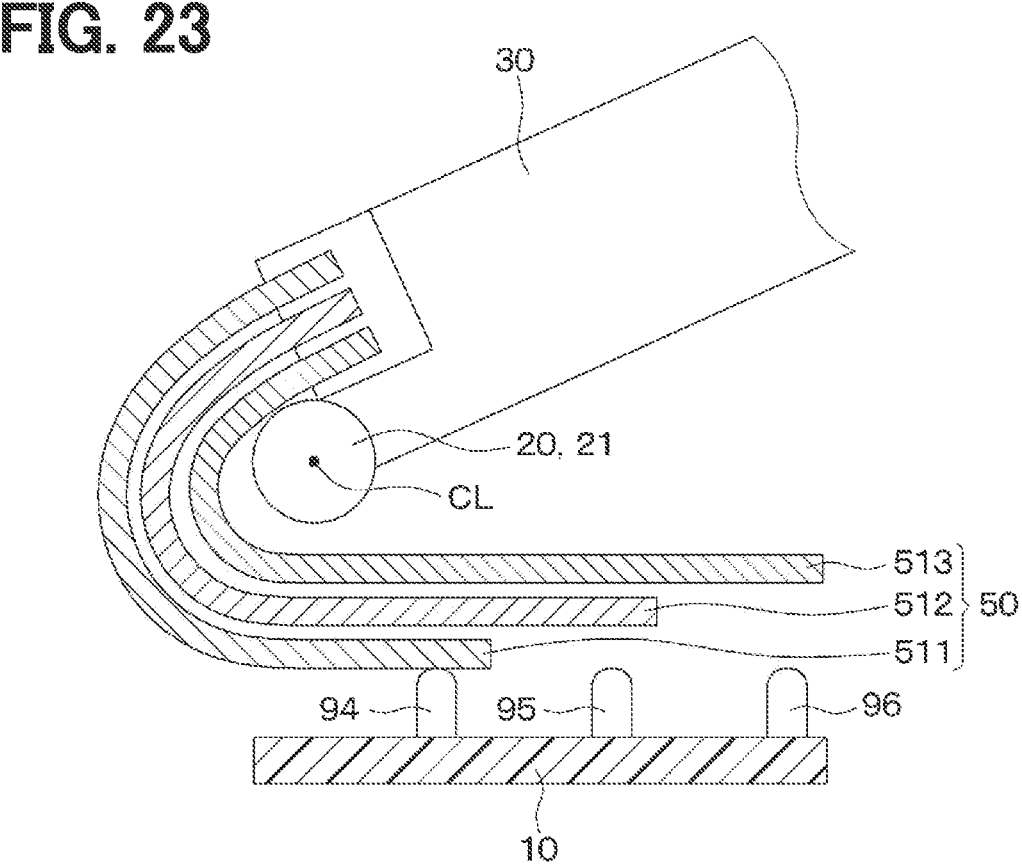
FIG. 23 is a schematic view of a pedal device according to a twelfth embodiment.

As shown in FIG. 23, in the twelfth embodiment as well, a reaction force generation mechanism 50 is constituted of a plurality of leaf springs. In the twelfth embodiment, the first leaf spring 511, the second leaf spring 512, and the third leaf spring 513 which constitutes the reaction force generation mechanism 50 are set to a shape curved so as to surround the rotational axis CL of the pedal pad 30. The curved portion of the second leaf spring 512 is arranged inside the curved portion of the first leaf spring 511, and the curved portion of the third leaf spring 513 is arranged inside the curved portion of the second leaf spring 512. The number of the leaf springs constituting the reaction force generation mechanism 50 is not limited to three, and may be two or four or more.

One end of each of the first to third leaf springs 511, 512, and 513 in the longitudinal direction is fixed to the end of the pedal pad 30 on the rotational axis CL side.

A first lower abutment pin 94 is provided on the housing 10 at a position corresponding to the first leaf spring 511. The first leaf spring 511 and the first lower abutment pin 94 are in abutment with each other in a state in which no driver's pedaling force is applied to the pedal pad 30.

Also, the housing 10 is provided with a second lower abutment pin 95 at a position corresponding to the second leaf spring 512. A predetermined gap is provided between the second leaf spring 512 and the second lower abutment pin 95 in a state in which no driver's pedaling force is applied to the pedal pad 30.

Also, the housing 10 is provided with the third lower abutment pin 96 at a position corresponding to the third leaf spring 513. A predetermined gap is provided between the third leaf spring 513 and the third lower abutment pin 96 in a state in which no driver's pedaling force is applied to the pedal pad 30. The gap between the third leaf spring 513 and the third lower abutment pin 96 is set larger than the gap between the second leaf spring 512 and the second lower abutment pin 95.

In the configuration of the twelfth embodiment, when the driver steps on the pedal pad 30, a load is applied from the pedal pad 30 to the first leaf spring 511 in abutment with the first lower abutment pin 94. Thus, the first leaf spring 511 bends so that the radius of curvature of its curved portion becomes smaller.

When the pedal stroke reaches a predetermined size, the second leaf spring 512 and the second upper abutment pin 95 come into abutment with each other. When the pedal stroke further increases from there, the first leaf spring 511 and the second leaf spring 512 bend.

After that, when the pedal stroke reaches another predetermined size larger than the predetermined size, the third leaf spring 513 and the third lower abutment pin 96 abut against each other. When the pedal stroke further increases from there, the first leaf spring 511, the second leaf spring 512, and the third leaf spring 513 bend. Consequently, the pedal device 1 of the twelfth embodiment can also obtain targeted pedaling force characteristics with a high spring constant by using the first to third leaf springs 511, 512, and 513 in the reaction force generation mechanism 50.

Also, the pedal device 1 of the twelfth embodiment also includes the first to third lower abutment pins 94, 95, and 96 brought into abutment with the first to third leaf springs 511, 512, and 513 with a predetermined pedal stroke. Therefore, as the rotational angle of the pedal pad 30 increases, the first to third leaf springs 511, 512, and 513 sequentially apply a reaction force to the pedal pad 30. Accordingly, it is possible to change the spring characteristics in the middle of the pedal stroke, so that targeted pedaling force characteristics can be obtained.

Further, even in the pedal device 1 of the twelfth embodiment, the first to third leaf springs 511, 512, and 513 can be arranged closer to each other by arranging the curved portion of another leaf spring inside the curved portion of the predetermined leaf spring, thereby making it possible to reduce the physical size of the pedal device 1.

The pedal device 1 of the twelfth embodiment described above can also bring about the same operative effects as those of the first embodiment and the like.

Thirteenth Embodiment

Figure 24:
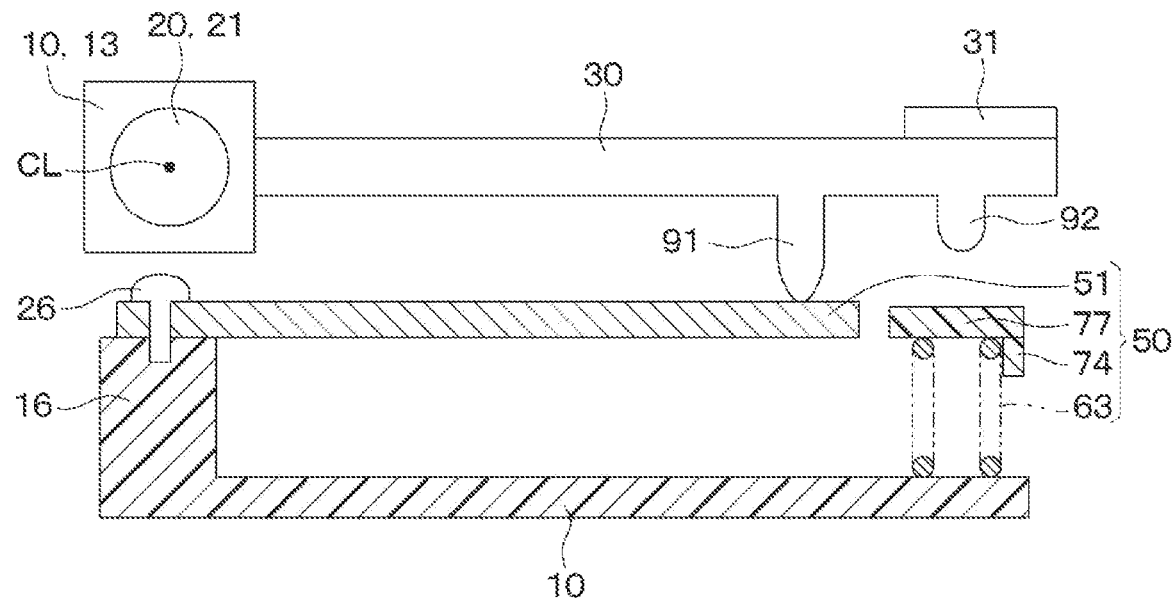
FIG. 24 is a schematic view of a pedal device according to a thirteenth embodiment.

As shown in FIG. 24, the thirteenth embodiment has a configuration in which a leaf spring 51 and a coil spring 63 constituting a reaction force generation mechanism 50 are arranged in parallel.

One end of the leaf spring 51 in the longitudinal direction is attached to a fixing base 16 of the housing 10 with a bolt 26 or the like. The other end of the leaf spring 51 in the longitudinal direction is in abutment with the first abutment pin 91 provided on the pedal pad 30.

One end of the coil spring 63 in the axial direction is engaged to a portion of a housing 10 different from a fixing base 16. A holder 77 is provided at the other end of the coil spring 63 in the axial direction. The holder 77 has a stopper 74. The stopper 74 extends from the holder 77 toward the housing 10. The stopper 74 can restrict the amount of deflection of the coil spring 63 by abutting on the housing 10 when the coil spring 63 bends.

A second abutment pin 92 is provided at a portion of the pedal pad 30 corresponding to the holder 77. A predetermined gap is provided between the second abutment pin 92 and the holder 77.

When the driver steps on the pedal pad 30 in the configuration of the thirteenth embodiment, a load is applied from the pedal pad 30 to the leaf spring 51 via a first abutment pin 91. Consequently, the leaf spring 51 bends so that the portion on the first abutment pin 91 side approaches the floor side or the dash panel side. When the pedal stroke reaches a predetermined size, the second abutment pin 92 and the holder 77 abut against each other. After that, when the pedal stroke is further increased, the leaf spring 51 and the coil spring 63 are bent. When the stopper 74 and the housing 10 abut against each other, the amount of deflection of the coil spring 63 is restricted and the maximum rotational position of the pedal pad 30 is defined. Thus, the pedal device 1 of the thirteenth embodiment can also obtain targeted pedaling force characteristics by means of the leaf spring 51 and the coil spring 63.

The pedal device 1 of the thirteenth embodiment described above can also bring about the same operative effects as those of the first embodiment and the like. Further, in the thirteenth embodiment, by arranging the leaf spring 51 and the coil spring 63 in parallel, it becomes easier to arrange them.

As a modification of the thirteenth embodiment, although not illustrated, there may be a pattern in which a gap is provided between the first abutment pin 91 and the leaf spring 51, and the second abutment pin 92 and the holder 77 are in abutment with each other. In that case, when the driver steps on the pedal pad 30, the coil spring 63 first bends, and then when the first abutment pin 91 and the leaf spring 51 come into abutment with each other, the leaf spring 51 and the coil spring 63 bend. In the modification of the thirteenth embodiment as well, it is possible to obtain targeted pedaling force characteristics by means of the leaf spring 51 and the coil spring 63.

Fourteenth Embodiment

Figure 25:
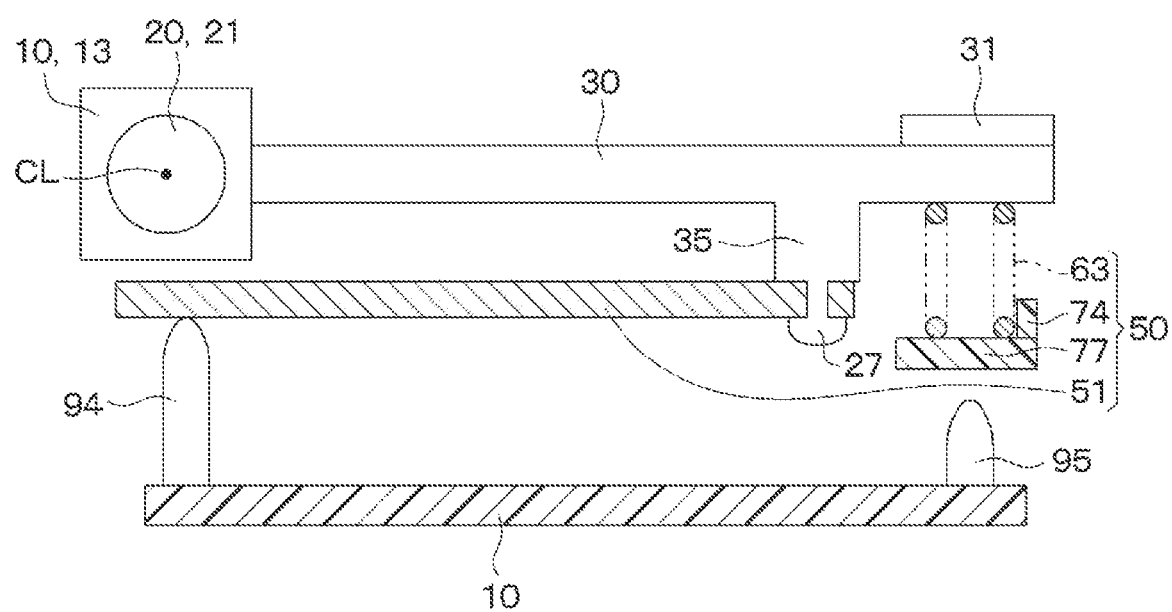
FIG. 25 is a schematic view of a pedal device according to a fourteenth embodiment.

As shown in FIG. 25, the fourteenth embodiment shows a change of the portion to fix the leaf spring 51 and the coil spring 63 constituting the reaction force generation mechanism 50 from the thirteenth embodiment.

One end of the leaf spring 51 in the longitudinal direction is fixed to a mounting portion 35 provided on a pedal pad 30 with a bolt 27 or the like. The other end of the leaf spring 51 in the longitudinal direction is in abutment with a first lower abutment pin 94 provided on a housing 10.

One end of the coil spring 63 in the axial direction is engaged to a portion of the pedal pad 30 which is farther from a rotational axis CL than the mounting portion 35. The holder 77 is provided at the other end of the coil spring 63 in the axial direction. The holder 77 has the stopper 74. The stopper 74 extends from a holder 77 toward the pedal pad 30 side. The stopper 74 restricts the amount of deflection of the coil spring 63 by abutting against the pedal pad 30 when the coil spring 63 is bent.

A second lower abutment pin 95 is provided at a portion of the housing 10 corresponding to the holder 77. A predetermined gap is provided between the second lower abutment pin 95 and the holder 77 in a state in which the pedaling force of a driver is not applied to the pedal pad 30.

In the configuration of the fourteenth embodiment, when the driver steps on the pedal pad 30, a load is applied to the leaf spring 51 fixed to the mounting portion 35 of the pedal pad 30. When the pedal stroke reaches a predetermined size, the second abutment pin 95 and the holder 77 abut against each other. After that, when the pedal stroke is further increased, the leaf spring 51 and the coil spring 63 are bent. When the stopper 74 and the pedal pad 30 abut against each other, the amount of deflection of the coil spring 63 is restricted and the maximum rotational position of the pedal pad 30 is defined. Thus, the pedal device 1 of the fourteenth embodiment can also obtain targeted pedaling force characteristics by means of the leaf spring 51 and the coil spring 63.

The pedal device 1 of the fourteenth embodiment described above can also bring about the same operative effects as those of the first embodiment and the like. Further, in the fourteenth embodiment, by arranging the leaf spring 51 and the coil spring 63 in parallel, it becomes easier to arrange them.

As a modification of the fourteenth embodiment, although not illustrated, there may be a pattern in which a gap is provided between the first lower abutment pin 94 and the leaf spring 51, and the second lower abutment pin 95 and the holder 77 are in abutment with each other. In that case, when the driver steps on the pedal pad 30, the coil spring 63 first bends, and then when the first lower abutment pin 94 and the leaf spring 51 come into abutment with each other, the leaf spring 51 and the coil spring 63 bend. In the modification of the fourteenth embodiment as well, targeted pedaling force characteristics can be obtained by means of the leaf spring 51 and the coil spring 63.

Fifteenth Embodiment

Figure 26:
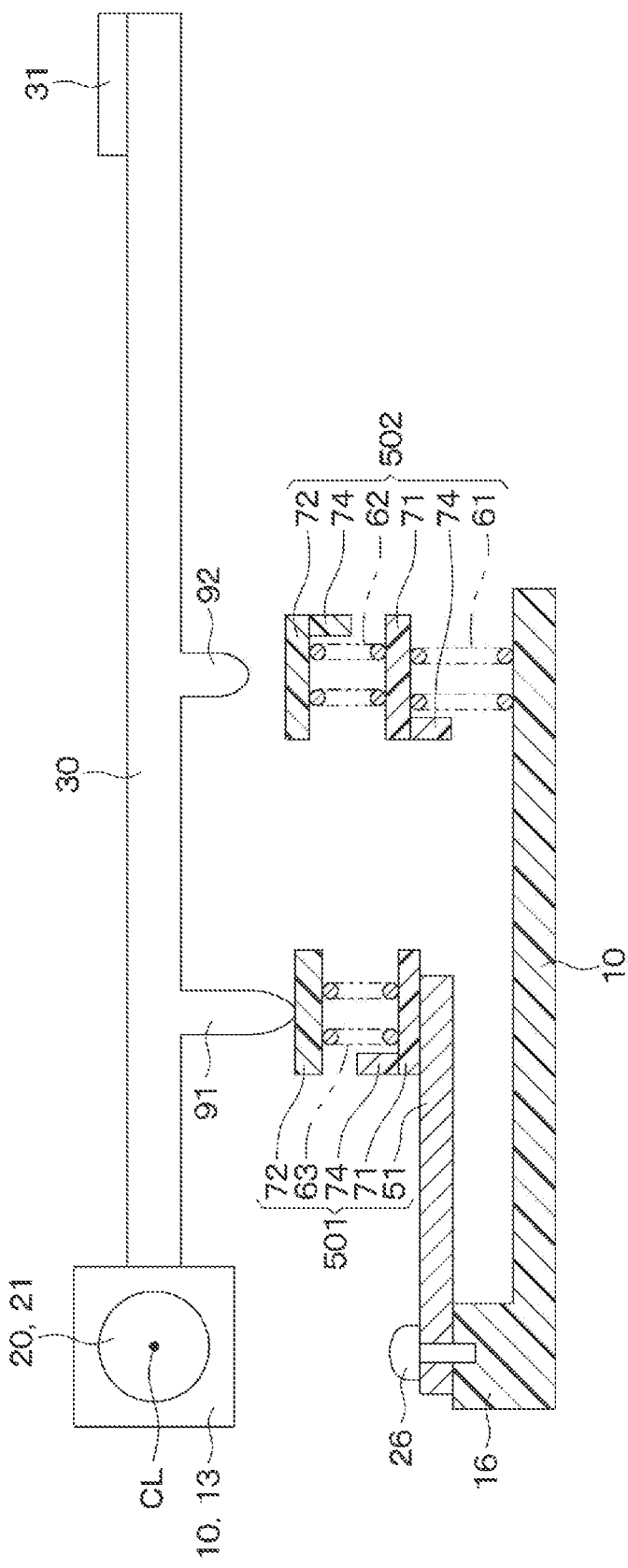
FIG. 26 is a schematic view of a pedal device according to a fifteenth embodiment.

As shown in FIG. 26, the fifteenth embodiment has a configuration in which a plurality of resilient members constituting a reaction force generation mechanism 50 are arranged both in series and parallel. A pedal device 1 of the fifteenth embodiment has a first reaction force generation mechanism 501 and a second reaction force generation mechanism 502. The first reaction force generation mechanism 501 and the second reaction force generation mechanism 502 are arranged in parallel.

The first reaction force generation mechanism 501 has a leaf spring 51, a coil spring 63, a first holder 71, and a second holder 72, etc. as in the seventh embodiment. The leaf spring 51 and the coil spring 63 included in the first reaction force generation mechanism 501 are arranged in series. A first abutment pin 91 is provided on the back surface of a pedal pad 30 at a position corresponding to the second holder 72 included in the first reaction force generation mechanism 501. The second holder 72 and the first abutment pin 91 included in the first reaction force generation mechanism 501 are in abutment with each other in a state in which no driver's pedaling force is applied to the pedal pad 30.

Although the stopper 74 is provided on the second holder 72 in the seventh embodiment, the stopper 74 is provided on the first holder 71 in the first reaction force generation mechanism 501 of the fifteenth embodiment. The stopper 74 restricts the amount of deflection of the coil spring 63 by coming into abutment with the second holder 72 when the coil spring 63 is bent. The stopper 74 may be provided on the second holder 72.

On the other hand, the second reaction force generation mechanism 502 is provided at a position far from the rotational axis CL of the pedal pad 30 with respect to the first reaction force generation mechanism. The second reaction force generation mechanism 502 has a first coil spring 61, a first holder 71, a second coil spring 62, and a second holder 72 in this order from the housing 10 side. One end of the first coil spring 61 in the axial direction is engaged to the housing 10, and the other end thereof is engaged to the first holder 71. One end of the second coil spring 62 in the axial direction is engaged to the first holder 71, and the other end thereof is engaged to the second holder 72. That is, the first coil spring 61 and the second coil spring 62 included in the second reaction force generation mechanism 502 are arranged in series.

A second abutment pin 92 is provided on the back surface of the pedal pad 30 at a position corresponding to the second holder 72 included in the second reaction force generation mechanism 502. A predetermined gap is provided between the second abutment pin 95 and the second holder 72 in a state in which the pedaling force of a driver is not applied to the pedal pad 30.

When the driver steps on the pedal pad 30, the coil spring 63 of the first reaction force generation mechanism 501 bends. Thereafter, when the second abutment pin 92 and the second reaction force generation mechanism 502 abut on each other, the coil spring 63 of the first reaction force generation mechanism 501 and the first and second coil springs 61 and 62 of the second reaction force generation mechanism 502 bend.

As in the pedal device 1 of the fifteenth embodiment described above, either leaf springs or coil springs may be used for the plurality of resilient members constituting the reaction force generation mechanism 50 and may be arranged in the form of both series arrangement and parallel arrangement. The pedal device 1 of the fifteenth embodiment can also bring about the same operative effects as those of the first embodiment and the like.

As a modification of the fifteenth embodiment, although not illustrated, there may be a pattern in which a gap is provided between the first reaction force generation mechanism 501 and the first abutment pin 91, and the second reaction force generation mechanism 502 and the second abutment pin 92 are in contact with each other. In that case, when the driver steps on the pedal pad 30, the first and second coil springs 61 and 62 of the second reaction force generation mechanism 502 first bend. After that, when the first abutment pin 91 and the first reaction force generation mechanism 501 abut on each other, the coil spring 63 of the first reaction force generation mechanism 501 and the first and second coil springs 61 and 62 of the second reaction force generation mechanism 502 bend. In the modification of the fifteenth embodiment as well, the first reaction force generation mechanism 501 and the second reaction force generation mechanism 502 can bring about targeted pedaling force characteristics.

Sixteenth Embodiment

Figure 27:
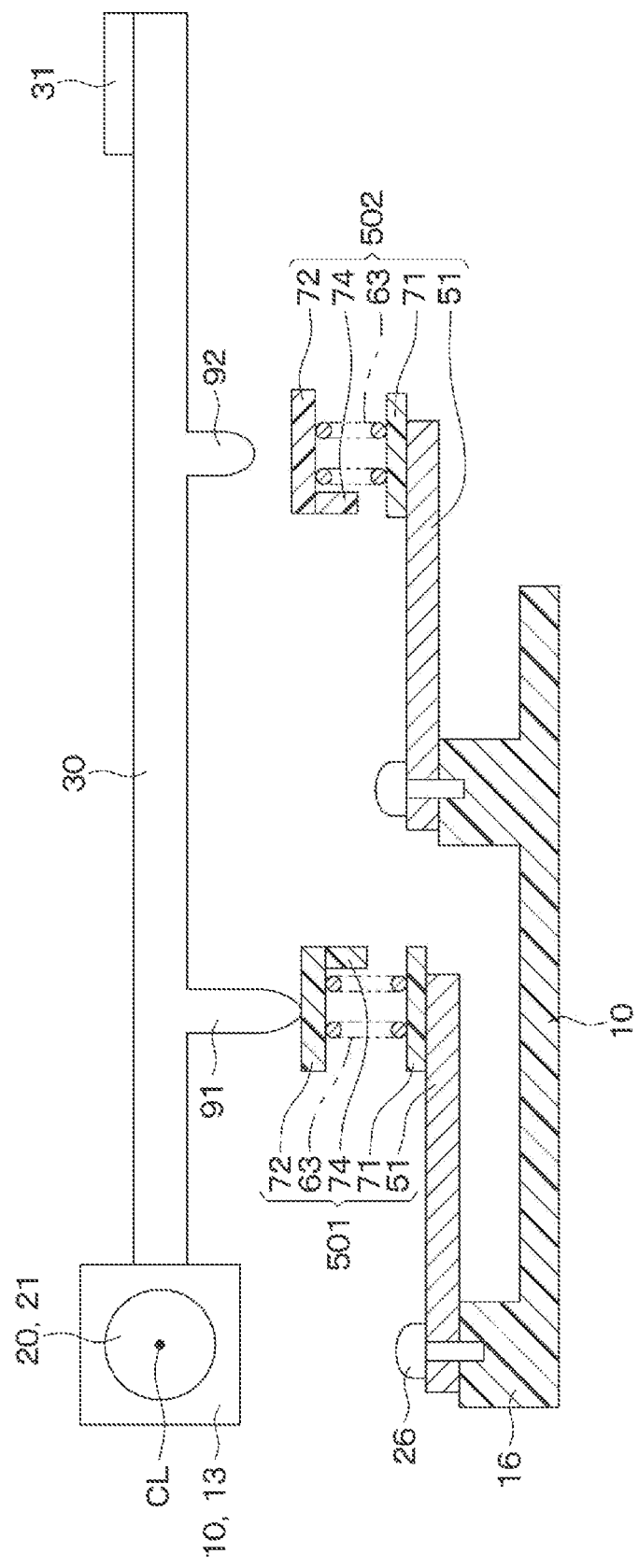
FIG. 27 is a schematic view of a pedal device according to a sixteenth embodiment.

As shown in FIG. 27, the sixteenth embodiment has a configuration in which a plurality of resilient members constituting a reaction force generation mechanism 50 are arranged both in series and parallel. A pedal device 1 of the sixteenth embodiment also has a first reaction force generation mechanism 501 and a second reaction force generation mechanism 502. The first reaction force generation mechanism 501 and the second reaction force generation mechanism 502 are arranged in parallel.

The first reaction force generation mechanism 501 has the leaf spring 51, the coil spring 63, the first holder 71, and the second holder 72, etc. as in the seventh embodiment. The leaf spring 51 and the coil spring 63 included in the first reaction force generation mechanism 501 are arranged in series. The first abutment pin 91 is provided on the back surface of the pedal pad 30 at a position corresponding to the second holder 72 included in the first reaction force generation mechanism 501. The second holder 72 and the first abutment pin 91 included in the first reaction force generation mechanism 501 are in abutment with each other in a state in which no driver's pedaling force is applied to the pedal pad 30.

On the other hand, the second reaction force generation mechanism 502 also has a leaf spring 51, a coil spring 63, a first holder 71, and a second holder 72, etc. as in the seventh embodiment. The leaf spring 51 and the coil spring 63 included in the second reaction force generation mechanism 502 are also arranged in series. The second abutment pin 92 is provided on the back surface of the pedal pad 30 at a position corresponding to the second holder 72 included in the second reaction force generation mechanism 502. A predetermined gap is provided between a second abutment pin 92 and the second holder 72.

When the driver steps on the pedal pad 30, the coil spring 63 of the first reaction force generation mechanism 501 first bends. After that, when the second abutment pin 92 and the second reaction force generation mechanism 502 abut on each other, the coil spring 63 of the first reaction force generation mechanism 501 and the coil spring 63 of the second reaction force generation mechanism 501 bend.

As in the pedal device 1 of the sixteenth embodiment described above, either leaf springs or coil springs may be used for the plurality of resilient members constituting the reaction force generation mechanism 50 and may be arranged in the form of both series arrangement and parallel arrangement. The pedal device 1 of the sixteenth embodiment described above can also bring about the same operative effects as those of the first embodiment and the like.

As a modification of the sixteenth embodiment, although not illustrated, there may be a pattern in which a gap is provided between the first reaction force generation mechanism 501 and the first abutment pin 91, and the second reaction force generation mechanism 502 and the second abutment pin 92 are in contact with each other. In that case, when the driver steps on the pedal pad 30, the coil spring 63 of the second reaction force generation mechanism 502 first bend. After that, when the first abutment pin 91 and the first reaction force generation mechanism 501 abut on each other, the coil spring 63 of the first reaction force generation mechanism 501 and the coil spring 63 of the second reaction force generation mechanism 502 bend. In the modification of the sixteenth embodiment as well, the first reaction force generation mechanism 501 and the second reaction force generation mechanism 502 can bring about targeted pedaling force characteristics.

Seventeenth Embodiment

Figure 28:
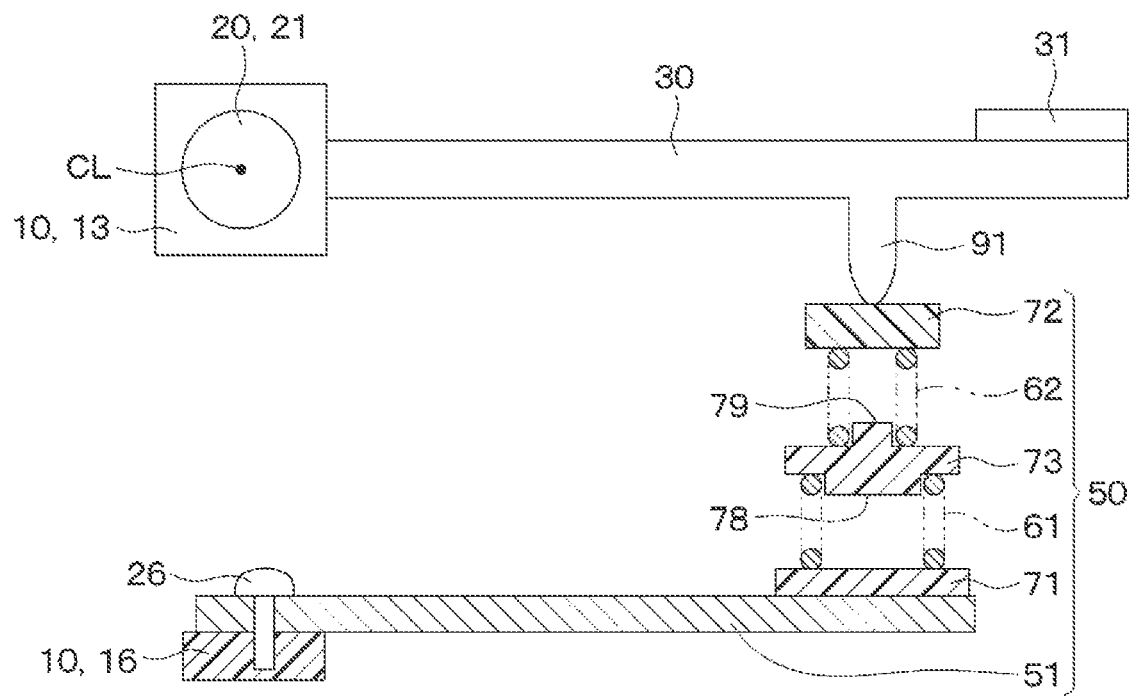
FIG. 28 is a schematic view of a pedal device according to a seventeenth embodiment.

As shown in FIG. 28, in the seventeenth embodiment, a reaction force generation mechanism 50 is constituted of a leaf spring 51, a first coil spring 61, a second coil spring 62, a first holder 71, a second holder 72, and a spring seat 73, etc.

One end of the leaf spring 51 in the longitudinal direction is attached to the fixing base 16 of the housing 10 with the bolt 26 or the like. The first holder 71, the first coil spring 61, the spring seat 73, the second coil spring 62, and the second holder 72 are provided in this order at the other end of the leaf spring 51 in the longitudinal direction.

The first holder 71 is formed, for example, in a cylindrical shape, and is fixed to the other end of the leaf spring 51 in the longitudinal direction by unillustrated bolts or rivets or the like.

The first coil spring 61 has one axial end engaged to the first holder 71 and the other axial end engaged to the spring seat 73.

The second coil spring 62 has one axial end engaged to the spring seat 73 and the other axial end engaged to the second holder 72. A surface of the second holder 72 on the side of a pedal pad 30 is in abutment with an abutment pin 91 provided on the pedal pad 30.

The spring seat 73 is formed, for example, in a cylindrical shape and arranged between the first coil spring 61 and the second coil spring 62. The spring seat 73 has a first protruding portion 78 provided inside the other end of the first coil spring 61 in the axial direction. The first protruding portion 78 functions as a "restricting portion" which restricts radial displacement of the other end of the first coil spring 61 in the axial direction. Further, the first protruding portion 78 also has a role of restricting the amount of deflection of the first coil spring 61 by coming into abutment with the first holder 71.

The spring seat 73 also has a second protruding portion 79 provided inside one end of the second coil spring 62 in the axial direction. The second protruding portion 79 functions as a "restricting portion" which restricts radial displacement of one end of the second coil spring 62 in the axial direction. Further, the second protruding portion 79 also has a role of restricting the amount of deflection of the second coil spring 62 by coming into abutment with the second holder 72.

Thus, since the radial displacements of the first coil spring 61 and the second coil spring 62 are restricted, the pedal device 1 of the seventeenth embodiment can also bring about targeted pedaling force characteristics by means of the first coil spring 61, the second coil spring 62, and the leaf spring 51.

The pedal device 1 of the seventeenth embodiment described above can also bring about the same operative effects as those of the first embodiment and the like.

Eighteenth Embodiment

Figure 29:
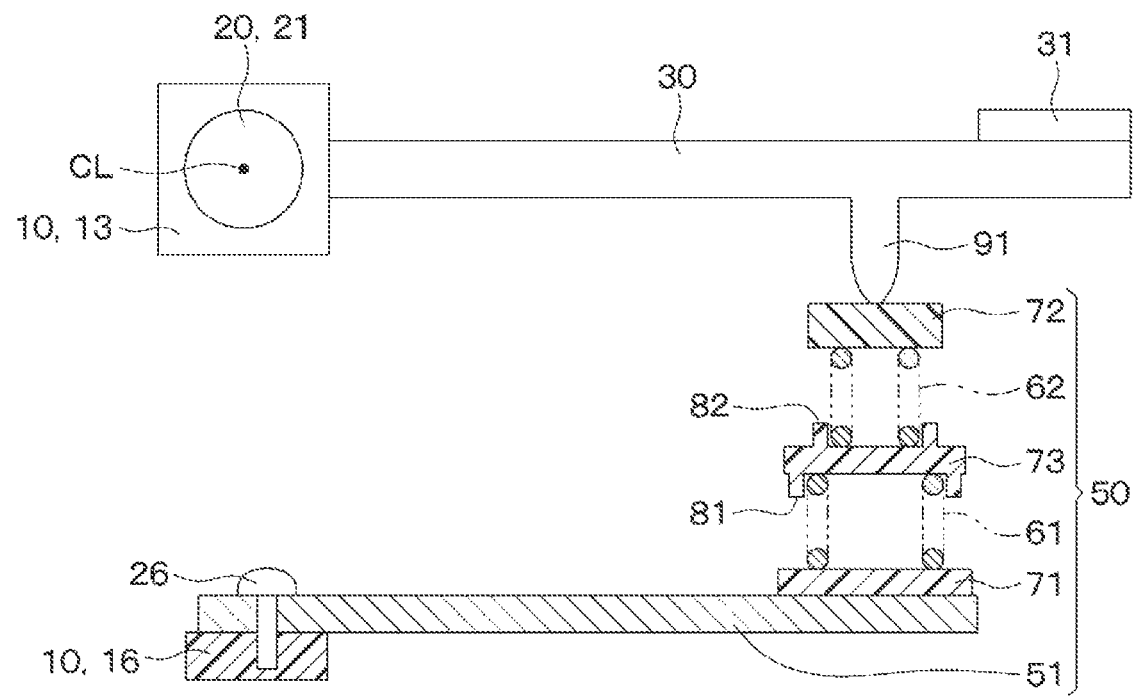
FIG. 29 is a schematic view of a pedal device according to an eighteenth embodiment.

As shown in FIG. 29, the eighteenth embodiment shows a modification of the seventeenth embodiment. Also in the eighteenth embodiment, the reaction force generation mechanism 50 is comprised of a leaf spring 51, a first coil spring 61, a second coil spring 62, a first holder 71, a second holder 72, and a spring seat 73, etc.

One end of the leaf spring 51 in the longitudinal direction is attached to the fixing base 16 of the housing 10 with the bolt 26 or the like. The first holder 71, the first coil spring 61, the spring seat 73, the second coil spring 62, and the second holder 72 are provided in this order at the other end of the leaf spring 51 in the longitudinal direction. The configurations of the first holder 71, the first coil spring 61, and the second coil spring 62 are the same as those of the seventeenth embodiment.

The spring seat 73 is formed, for example, in the cylindrical shape and arranged between the first coil spring 61 and the second coil spring 62. The spring seat 73 has a first annular protruding portion 81 provided so as to surround the outside of the other end of the first coil spring 61 in the axial direction. The first annular protruding portion 81 functions as a "restriction portion" which restricts radial displacement of the other end of the first coil spring 61 in the axial direction. Further, the first annular protruding portion 81 also has a role of restricting the amount of deflection of the first coil spring 61 by coming into abutment with the first holder 71.

The spring seat 73 also has a second annular protruding portion 82 provided so as to surround the outside of one end of the second coil spring 62 in the axial direction. The second annular protruding portion 82 functions as a "restriction portion" which restricts radial displacement of one end of the second coil spring 62 in the axial direction. The second annular protruding portion 82 also has a role of restricting the amount of deflection of the second coil spring 62 by coming into abutment with the second holder 72.

Thus, since the radial displacements of the first coil spring 61 and the second coil spring 62 are restricted, the pedal device 1 of the eighteenth embodiment can also bring about targeted pedaling force characteristics by means of the first coil spring 61, the second coil spring 62, and the leaf spring 51.

The pedal device 1 of the eighteenth embodiment described above can also bring about the same operative effects as those of the first embodiment and the like.

OTHER EMBODIMENTS (1) In the above first embodiment, the organ-type brake pedal device has been described as an example of the pedal device 1, but the present invention is not limited to this. The pedal device 1 may be, for example, a pendant-type brake pedal device, an organ-type accelerator pedal device, or a pendant-type accelerator pedal device.

As described above, the organ-type pedal device 1 refers to one having a configuration in which the portion of the pedal pad 30 which is stepped on by the driver is arranged above relative to the rotational axis CL in the vertical direction when mounted on the vehicle. Compared to the pendant-type pedal device 1, the organ-type pedal device 1 has a narrower space in which the reaction force generating mechanism 50 can be mounted, and requires a smaller physique. Using a leaf spring 51 in the resilient member constituting the reaction force generation mechanism 50 is therefore effective.

On the other hand, the pendant-type pedal device 1 refers to one having a configuration in which the portion of the pedal pad 30 which is stepped on by the driver is arranged below relative to the rotational axis CL in the vertical direction when mounted on the vehicle. In the pendant-type pedal device 1 as well, the physical size of the pedal device 1 can be reduced by using the leaf spring 51 for the resilient member constituting the reaction force generation mechanism 50.

(2) In each of the above embodiments, as an example of the pedal device 1, description has been made about the example in which the pedal pad 30 and the master cylinder are not mechanically connected, but the present invention is not limited to this. For example, the pedal device 1 may be one in which the pedal pad 30 and the master cylinder are mechanically connected.

(3) In each of the above embodiments, the sensor unit 40 is provided around the rotation shaft of the pedal device 1, but the present invention is not limited to this. For example, the sensor unit 40 may be provided on the pedal pad 30 or a member linked thereto (for example, the reaction force generation mechanism 50, etc.).

The present disclosure is not limited to the above-described embodiments, and can be modified as appropriate. Also, the above-described embodiments are not unrelated to each other, and can be appropriately combined unless the combination is clearly impossible. Further, in each of the above-described embodiments, it goes without saying that the elements constituting the embodiment are not necessarily essential, unless it is explicitly stated that they are essential, or they a In addition, in each of the above-described embodiments, when numerical values such as the number, numerical values, amount, range, etc. of the constituent elements of the embodiment are mentioned, except in the cases where it is clearly stated that they are particularly essential, and where they are clearly limited to specific numbers in principle, etc., they are not limited to the specific numbers. Moreover, in each of the above-described embodiments, when referring to the shape, positional relationship, etc. of components, etc., unless otherwise specified and limited in principle to a specific shape, positional relationship, etc., they are not limited to the shape, positional relationship, etc.

What is claimed is:

1. A pedal device to be mounted on a vehicle, the pedal device comprising:
    a housing mounted on a vehicle body;
    a pedal pad rotational relative to the housing and having a surface, which is to be stepped on by a driver; and
    a reaction force generation mechanism including a plurality of resilient members including a predetermined leaf spring, wherein
    the reaction force generation mechanism is
        arranged in a space on an opposite side of the surface of the pedal pad, and
        configured to generate a reaction force against a pedaling force applied to the pedal pad by the driver,
    the predetermined leaf spring is
        resiliently deformable when receiving a load in a plate thickness direction,
        in a flat shape or in a flat shape in which at least one of a thickness or a width changes, and
        in a linear shape or in a curved shape in a longitudinal direction when the load is not applied,
    one end of the predetermined leaf spring is fixed to the housing or the vehicle body,
    an other end of the predetermined leaf spring is a free end,
    among the resilient members of the reaction force generation mechanism, at least one of the resilient members, excluding the predetermined leaf spring, is
        arranged in series at the other end of the predetermined leaf spring in the longitudinal direction,
        arranged between the other end of the predetermined leaf spring in the longitudinal direction and one of an abutment pin provided to the pedal pad, a connecting rod connected to the pedal pad, or the pedal pad,
    the predetermined leaf spring is configured not to be restricted in an amount of bend from an initial position, at which the pedaling force is not applied to the pedal pad by the driver, to a maximum rotational position, at which the pedaling force is applied to the pedal pad by the driver and the pedal pad has rotated at maximum, and
    among the resilient members of the reaction force generation mechanism, at least one of the resilient members, excluding the predetermined leaf spring, is configured to be restricted in an amount of deformation at a position between the initial position and the maximum rotational position.

2. The pedal device according to claim 1, wherein the reaction force generation mechanism includes
    a first holder that locks one end of the at least one of the resilient members excluding the predetermined leaf spring, and
    a second holder that locks an other end of the at least one of the resilient members excluding the predetermined leaf spring.

3. The pedal device according to claim 2, wherein the reaction force generation mechanism includes a stopper provided to one of the first holder and the second holder, and
    when at least one of the resilient members, excluding the predetermined leaf spring, deforms, the stopper abuts against an other of the first holder and the second holder to restrict an amount of deformation of the at least one of the resilient members.

4. The pedal device according to claim 2, wherein the first holder and the second holder have a guide surface that enables the first holder and the second holder to move linearly relative to each other in a direction in which the first holder and the second holder face each other.

5. The pedal device according to claim 4, wherein one of the first holder and the second holder is a cylindrical member having a bottom surface, and
    an other of the first holder and the second holder is a columnar member arranged inside the cylindrical member.

6. The pedal device according to claim 2, wherein one of the first holder and the second holder includes a restriction portion configured to restrict a coil spring, which is the at least one of the resilient members excluding the predetermined leaf spring, from moving in a radial direction.

7. The pedal device according to claim 2, wherein among the resilient members of the reaction force generation mechanism, resilient members, excluding the predetermined leaf spring, are coil springs,
    the coil springs are arranged between the first holder and the second holder, and
    the reaction force generation mechanism includes a spring seat between a predetermined one of the coil springs and an other of the coil springs.

8. The pedal device according to claim 7, wherein the spring seat includes a restriction portion configured to restrict the coil springs from moving in a radial direction.

9. The pedal device according to claim 7, wherein
a diameter of the predetermined one of the coil springs and a diameter of the other of the coil springs are different from each other.

10. The pedal device according to claim 7, wherein
the spring seat includes
a spring seat tubular portion in a cylindrical shape,
a flange portion extending radially outward from one end of the spring seat tubular portion in an axial direction, and
a spring seat bottom portion provided to an other end of the spring seat tubular portion in the axial direction.

11. The pedal device according to claim 10, wherein
an inner wall surface of the spring seat tubular portion on a radially inner side and an outer wall surface of the spring seat tubular portion on a radially outer side respectively define guide surfaces configured to guide the coil springs to deform in the axial direction while restricting the coil springs from moving in a radial direction.

12. The pedal device according to claim 10, wherein
an outer wall surface of the flange portion of the spring seat on a radially outside is a curved surface that is convex on the radially outside, and
a predetermined gap is formed between an inner wall surface of a cylindrical member of the first holder or the second holder on a radially inside and the outer wall surface of the flange portion of the spring seat on the radially outside.

13. The pedal device according to claim 1, wherein
the reaction force generation mechanism includes an other leaf spring, and
the reaction force generation mechanism has a configuration in which one end or an other end of the other leaf spring is arranged at one end or an other end of the predetermined leaf spring in the longitudinal direction.

14. The pedal device according to claim 13, further comprising:
the abutment pin that is
provided at a position that enables the abutment pin to abut the predetermined leaf spring or the other leaf spring in a bent state and
configured to restrict an amount of bend of at least one of the predetermined leaf spring and the other leaf spring.

15. The pedal device according to claim 1, wherein
at least one of the resilient members of the reaction force generation mechanism has
one end fixed to one of the pedal pad and the housing and
an other end abuttable against an abutment pin provided to an other of the pedal pad and the housing.

16. The pedal device according to claim 1, wherein
the resilient members of the reaction force generation mechanism include a leaf spring and/or a coil spring arranged in series.

17. The pedal device according to claim 1, wherein
the reaction force generation mechanism is arranged inside the housing.

18. The pedal device according to claim 1, wherein
the housing is fixed by a screw to a floor or a dash panel in a vehicle interior of the vehicle body.

19. The pedal device according to claim 1, wherein
one end of the predetermined leaf spring in the longitudinal direction is arranged in a region closer to a floor or a dash panel of a vehicle interior than a rotation shaft of the pedal pad.

20. The pedal device according to claim 1, wherein
one end of the predetermined leaf spring in the longitudinal direction is attached to
a portion of the housing on a side of a floor or on a side of a dash panel in a vehicle interior or
the floor or the dash panel in the vehicle interior.

* * * * *